United States Patent
Yoshida et al.

(10) Patent No.: US 9,670,356 B2
(45) Date of Patent: Jun. 6, 2017

(54) MATRIX MATERIAL

(71) Applicants: HONDA MOTOR CO., LTD., Tokyo (JP); FUKUI PREFECTURAL GOVERNMENT, Fukui-shi, Fukui (JP)

(72) Inventors: Shuichiro Yoshida, Wako (JP); Keiichi Kondo, Fukui (JP)

(73) Assignees: HONDA MOTOR CO., LTD., Tokyo (JP); FUKUI PREFECTURAL GOVERNMENT, Fukui-Shi (JP)

( * ) Notice: Subject to any disclaimer, the term of this patent is extended or adjusted under 35 U.S.C. 154(b) by 0 days.

(21) Appl. No.: 14/965,390

(22) Filed: Dec. 10, 2015

(65) Prior Publication Data
US 2016/0168371 A1 Jun. 16, 2016

(30) Foreign Application Priority Data

Dec. 11, 2014 (JP) .................................. 2014-250533
Dec. 11, 2014 (JP) .................................. 2014-250540

(51) Int. Cl.
*C08L 63/00* (2006.01)
*C08K 7/06* (2006.01)
*C08K 3/04* (2006.01)

(52) U.S. Cl.
CPC ................. *C08L 63/00* (2013.01); *C08K 3/04* (2013.01); *C08K 7/06* (2013.01); *C08L 2205/02* (2013.01); *C08L 2205/03* (2013.01); *C08L 2666/55* (2013.01)

(58) Field of Classification Search
CPC .. C08L 63/00; C08L 2205/02; C08L 2205/03; C08L 2666/55; C08K 7/06; C08K 3/04
See application file for complete search history.

(56) References Cited

U.S. PATENT DOCUMENTS 4,985,530 A * 1/1991 Murakami ........... C08G 59/245
525/524
2010/0151137 A1* 6/2010 Kouchi .................. C08G 59/18
427/386

FOREIGN PATENT DOCUMENTS

| JP | 08-334455 | 12/1996 |
| JP | 09-208838 | 8/1997 |
| JP | 2003-321557 | 11/2003 |
| JP | 2006-249395 | 9/2006 |
| JP | 2011-214209 | 10/2011 |

* cited by examiner

*Primary Examiner* — Robert Jones, Jr.
(74) *Attorney, Agent, or Firm* — Rankin, Hill & Clark LLP

(57) ABSTRACT

A matrix material for a carbon fiber-reinforced composite comprises a matrix resin as a resin component. The matrix resin contains both a first epoxy resin and a second epoxy resin or only the first epoxy resin, further contains a third epoxy resin, and has an average epoxy equivalent weight of 109 to 162. The first epoxy resin contains a polyfunctional glycidylamine-type epoxy resin. The second epoxy resin contains at least one of a p-aminophenol-type epoxy resin and a tetramethylbiphenol-type solid epoxy resin. The third epoxy resin contains a bisphenol A-type epoxy resin having a weight-average molecular weight of 8000.

13 Claims, 6 Drawing Sheets

FIG. 1

| | FIRST EPOXY RESIN | SECOND EPOXY RESIN | | THIRD EPOXY RESIN | HARDENER (PARTS BY WEIGHT) | AVERAGE EPOXY EQUIVALENT WEIGHT OF MATRIX RESIN | COMPLEX VISCOSITY $\eta^*$ (Pa·s) | SHEAR STRENGTH $\tau$ (MPa) |
|---|---|---|---|---|---|---|---|---|
| | MY721 (phr) | JER630 (phr) | YX4000 (phr) | JER1006FS (phr) | | | | |
| EXAMPLE 1 | 40 | 40 | 0 | 20 | 66 | 120 | 220 | 94 |
| EXAMPLE 2 | 30 | 50 | 10 | 10 | 62 | 112 | 220 | 86 |
| EXAMPLE 3 | 45 | 50 | 20 | 5 | 58 | 115 | 280 | 90 |
| EXAMPLE 4 | 30 | 30 | 30 | 10 | 65 | 127 | 410 | 86 |
| EXAMPLE 5 | 30 | 10 | 50 | 10 | 48 | 146 | 210 | 80 |
| EXAMPLE 6 | 30 | 15 | 50 | 5 | 49 | 136 | 205 | 83 |
| EXAMPLE 7 | 70 | 10 | 15 | 5 | 57 | 116 | 480 | 86 |
| COMPARATIVE EXAMPLE 1 | 50 | 50 | 0 | 0 | 64 | 99 | 32 | — |

FIG. 2

| | FIRST EPOXY RESIN | SECOND EPOXY RESIN | | THIRD EPOXY RESIN | HARDENER (PARTS BY WEIGHT) | AVERAGE EPOXY EQUIVALENT WEIGHT OF MATRIX RESIN | COMPLEX VISCOSITY $\eta^*$ (Pa·s) | SHEAR STRENGTH $\tau$ (MPa) |
|---|---|---|---|---|---|---|---|---|
| | MY721 (phr) | JER630 (phr) | YX4000 (phr) | JER1006FS (phr) | | | | |
| EXAMPLE 8 | 60 | 20 | 5 | 15 | 61 | 121 | 210 | 94 |
| EXAMPLE 9 | 70 | 10 | 10 | 10 | 58 | 120 | 230 | 87 |
| EXAMPLE 10 | 70 | 15 | 10 | 5 | 59 | 113 | 440 | 89 |
| EXAMPLE 11 | 25 | 40 | 30 | 5 | 56 | 118 | 210 | 90 |
| EXAMPLE 12 | 30 | 50 | 15 | 5 | 61 | 109 | 200 | 92 |
| EXAMPLE 13 | 30 | 40 | 10 | 20 | 63 | 126 | 250 | 90 |
| EXAMPLE 14 | 30 | 10 | 50 | 10 | 46 | 146 | 200 | 81 |
| EXAMPLE 15 | 20 | 10 | 60 | 10 | 45 | 155 | 210 | 81 |
| EXAMPLE 16 | 20 | 0 | 75 | 5 | 41 | 162 | 200 | 77 |
| COMPARATIVE EXAMPLE 2 | 70 | 24 | 6 | 0 | 60 | 107 | 66 | |

FIG. 3

| COMPARATIVE EXAMPLES | JER828 (phr) | HARDENER (PARTS BY WEIGHT) | EPOXY EQUIVALENT WEIGHT | COMPLEX VISCOSITY $\eta^*$ (Pa·s) | SHEAR STRENGTH $\tau$ (MPa) |
|---|---|---|---|---|---|
| CARBON FIBER A | 100 | 33 | 190 | 12 | 55 |
| CARBON FIBER B | 100 | 33 | 190 | 12 | 49 |

FIG. 4

| MATRIX MATERIAL | FOURTH EPOXY RESIN MY721 (phr) | FIFTH EPOXY RESIN | | HARDENER (PARTS BY WEIGHT) | AVERAGE EPOXY EQUIVALENT WEIGHT OF MATRIX RESIN |
|---|---|---|---|---|---|
| | | JER828 (phr) | JER1001 (phr) | | |
| a | 30 | 40 | 30 | 34 | 180 |
| b | 60 | 20 | 20 | 43 | 140 |
| c | 20 | 60 | 20 | 34 | 183 |
| d | 30 | 25 | 45 | 30 | 196 |

FIG. 6

| STRUCTURE | LOSS ANGLE δ (rad) | PRESSURIZATION START TIME POINT (min) | | | | DEFECT NUMBER (DEFECTS) | | | | THICKNESS (mm) | | | |
|---|---|---|---|---|---|---|---|---|---|---|---|---|---|
| | | a | b | c | d | a | b | c | d | a | b | c | d |
| C1 | 1.57 | 7.3 | 6.9 | 7.2 | 7.6 | 0 | 0 | 0 | 0 | 0.931 | 0.909 | 0.932 | 0.941 |
| C2 | 1.48 | 13.3 | 14.5 | 14.8 | 12.8 | 0 | 0 | 0 | 0 | 0.926 | 0.933 | 0.911 | 0.934 |
| C3 | 1.35 | 15.3 | 16.7 | 15.8 | 14.9 | 0 | 0 | 0 | 0 | 0.977 | 0.981 | 0.975 | 0.987 |
| C4 | 1.19 | 16 | 17.1 | 18.2 | 15.3 | 0 | 0 | 0 | 0 | 0.985 | 1.086 | 1.088 | 0.992 |
| C5 | 0.92 | 17 | 19.3 | 19.1 | 16.2 | 0 | 4 | 2 | 3 | 1.118 | 1.109 | 1.011 | 1.100 |
| C6 | 0.55 | 19 | 20.1 | 19.6 | 18.1 | 2 | 1 | 0 | 1 | 1.094 | 1.136 | 1.168 | 1.159 |
| C7 | 0.43 | 22.3 | 22.1 | 23.4 | 20.9 | 2 | 3 | 1 | 2 | 1.115 | 1.125 | 1.112 | 1.116 |

MATRIX MATERIAL

CROSS-REFERENCE TO RELATED APPLICATIONS

This application is based upon and claims the benefit of priority from Japanese Patent Applications Nos. 2014-250533 and 2014-250540 both filed on Dec. 11, 2014, the contents all of which are incorporated herein by reference.

BACKGROUND OF THE INVENTION

Field of the Invention

The present invention relates to a matrix material for a carbon fiber-reinforced composite and a matrix material for an organic fiber-reinforced composite.

Description of the Related Art

A structure made of a fiber-reinforced composite (FRP) has a light weight and an excellent mechanical strength, and thus has been widely used in various fields. In general, the structure is produced via a FRP prepreg. A reinforcing fiber sheet, which includes a bundle (UD material) containing a plurality of reinforcing fibers arranged parallel to each other, a cross material containing reinforcing fibers woven horizontally and vertically, or the like, is impregnated with a matrix material to form a prepreg sheet. A plurality of such prepreg sheets are stacked and molded under heat and pressure, and then the matrix material is hardened to obtain the FRP structure.

It is preferred that the matrix material contains an epoxy resin as a resin component (matrix resin) from the viewpoints of strength, heat resistance, etc. The reinforcing fiber is preferably a carbon fiber or an organic fiber.

For example, a production method described in Japanese Laid-Open Patent Publication No. 09-208838 may be used in a case where a carbon fiber is impregnated with a matrix material containing a matrix resin of a thermosetting resin such as an epoxy resin to form the prepreg. First, the matrix material is thermally softened and applied to at least one of two release papers, whereby a resin film containing the matrix material is formed on the release paper. Then, the softened resin film is brought into contact with the carbon fiber and is pressed between the release papers. The carbon fiber can be impregnated with the matrix material to obtain the prepreg in this manner.

In order to produce a structure having an excellent property such as a high strength from the prepreg, a satisfactory amount of the matrix material has to be sufficiently introduced into the inside of the carbon fiber to achieve a good property in the prepreg. The viscosity of the matrix material in the softened state (which may be referred to simply as the viscosity of the matrix material) may be lowered to improve an impregnation property of the matrix material. However, when the viscosity of the matrix material is excessively lowered, the matrix material may flow out from the carbon fiber, so that the matrix material amount may be insufficient in the prepreg disadvantageously. In addition, the matrix material having the low viscosity may readily adhere to another member or the like, so that the handling property of the prepreg may be deteriorated disadvantageously.

When the viscosity of the matrix material is excessively increased to avoid the above problems, the impregnation property is deteriorated. Consequently, it is difficult to achieve improvement of the impregnation property of the matrix material (the matrix resin) while preventing the matrix material from flowing out, for the purpose of preparing the prepreg where the carbon fiber is sufficiently impregnated with the satisfactory amount of the matrix material.

In above-described Japanese Laid-Open Patent Publication No. 09-208838, a technology using a matrix material with a viscosity after the impregnation higher than a viscosity during the impregnation is proposed to achieve both of the improvement of the impregnation property of the matrix material and the prevention of the flow out. Specifically, in the production method described in Japanese Laid-Open Patent Publication No. 09-208838, the matrix material for the prepreg contains a matrix resin, a radical-polymerizable unsaturated compound, and a polymerization initiator capable of generating a radical under heating. Thus, first, the carbon fiber is impregnated with the matrix material having a low viscosity and a high impregnation property before the heat treatment. Then, the heat treatment is carried out to form a polymer from the radical-polymerizable unsaturated compound, whereby the viscosity of the matrix material is increased after the impregnation. As a result, the prepreg can be obtained with improved handling property while preventing the flow out of the matrix material.

In particular, the prepreg and the structure prepared using the UD material of the carbon fiber exhibit a lower strength in a direction perpendicular to the fiber direction than in the fiber direction. Furthermore, in a case where a plurality of the prepreg sheets prepared using the UD material or the cross material are stacked, the resultant structure exhibits a lower strength between the sheets in the stacking direction than in the fiber direction. Thus, the CFRP structure exhibits a relatively low strength in a particular direction, and has an anisotropic strength property. However, in the case of using the structure as a member of an aircraft or the like, the structure is required to have an extremely excellent strength property, etc. Therefore, it is necessary to sufficiently improve the strength of the structure in the particular direction mentioned above.

The strength property of the entire structure, including the strength in the particular direction, can be improved by increasing the interface adhesion between the carbon fiber and the matrix material to suppress the strength reduction due to the anisotropy. Japanese Laid-Open Patent Publication Nos. 2011-214209 and 2006-249395 each propose a method for increasing the adhesion.

The technology of Japanese Laid-Open Patent Publication No. 2011-214209 contains subjecting a carbon fiber bundle to a surface treatment. In this treatment, a sizing agent of a mixture containing a first compound and a second compound at a particular ratio is applied to the surface of the carbon fiber bundle. More specifically, in this treatment, the first and second compounds are dissolved in an organic solvent or water to prepare a solution of the sizing agent, the carbon fiber bundle is immersed in the solution, and the organic solvent and the like are evaporated and removed. The first compound has a hydroxyl group and/or a carboxyl group with a primary amino group and/or a secondary amino group, and the second compound has an epoxy group.

In Japanese Laid-Open Patent Publication No. 2006-249395, a carbon fiber is surface-treated with a sizing agent containing a vinyl ester resin or the like, and an unsaturated matrix resin and an epoxy resin are mixed to prepare a matrix material. In the surface treatment, the surface of the carbon fiber is subjected to an oxidation treatment and then impregnated with the sizing agent using an immersion roller, etc. The unsaturated matrix resin may be a vinyl ester resin or the like, and the epoxy resin may be a bisphenol A-type epoxy resin or the like.

On the other hand, in the case of using the organic fiber as the reinforcing fiber, the organic fiber is advantageous over inorganic fibers in that the cost of the structure can be easily reduced. Furthermore, for example, an aramid fiber or the like can be used as the organic fiber to produce the structure with excellent strength, impact resistance, etc.

Accordingly, as the matrix material for forming the prepreg using the organic fiber as the reinforcing fiber, for example, an epoxy resin composition containing an epoxy resin as the matrix resin is proposed in Japanese Laid-Open Patent Publication No. 2003-321557.

This epoxy resin composition contains components A to C of epoxy resins and a component D of a thermoplastic resin to improve the adhesion and flexibility of the prepreg. Specifically, the component A is an epoxy resin that has a viscosity of 300 poise or less at 25° C., has an epoxy equivalent weight of 300 or less, and is in the liquid state at room temperature. The component B is a phenol novolac epoxy resin. The component C is an epoxy resin that has an epoxy equivalent weight of 400 to 2000 and is in the solid state at room temperature. The component D is a thermoplastic resin such as a polyvinyl acetal resin soluble in each of the components A to C.

SUMMARY OF THE INVENTION

As described above, in the production method described in Japanese Laid-Open Patent Publication No. 09-208838, the viscosity of the matrix material after the heat treatment is increased to obtain the prepreg capable of preventing the flow out of the matrix material. Thus, in this prepreg production method, the prevention of the matrix material flow out is not considered in the steps prior to the heat treatment. Consequently, it is necessary to handle the matrix material with a low viscosity in the step of forming the resin film on the release paper, the step of pressing the carbon fiber between the release papers, and the like, before the heat treatment.

The matrix material with the low viscosity is readily spread on the release paper. Therefore, in the step of applying the matrix material to the release paper, the resultant resin film may fail to have a desired thickness (resin amount). Furthermore, the resin film formed on the release paper has a low viscosity and readily flows out from the release paper. Therefore, it is difficult to maintain the thickness (resin amount) of the resin film. Furthermore, the resin film having the low viscosity readily adheres to the release paper. Therefore, in the step of winding the release paper having the resin film around a wind-up roll or the like, the release paper cannot be easily handled.

In addition, in the step of bringing the carbon fiber into contact with the resin film and pressing the carbon fiber between the release papers to impregnate the carbon fiber with the matrix material, the matrix material having the low viscosity flows out readily from the carbon fiber.

Consequently, even in the case of using the production method described in Japanese Laid-Open Patent Publication No. 09-208838, the lack of the matrix resin in the prepreg cannot be sufficiently avoided.

As described above, in the production method described in Japanese Laid-Open Patent Publication No. 09-208838, the matrix material is hardened to prepare the prepreg. Therefore, in the step of molding the prepreg under heat and pressure to form the structure, the prepreg may have a lowered moldability, and it may be difficult to produce the structure with a sufficiently improved strength.

Incidentally, commercially available carbon fibers have a surface coated with a sizing agent. In the case of applying another sizing agent to such a commercially available product as described in Japanese Laid-Open Patent Publication Nos. 2011-214209 and 2006-249395, an additional surface treatment and a resin for the sizing agent are required. Therefore, a complicated process may be required for producing the CFRP structure, and the production cost may be increased. Furthermore, in a case where the resin for the sizing agent is mixed with the matrix material, for example, the hardening of the matrix resin may be inhibited, so that the strength of the structure cannot be sufficiently improved.

Particularly in the surface treatment of Japanese Laid-Open Patent Publication No. 2011-214209, the sizing agent is dissolved in the organic solvent or the like and then applied to the carbon fiber, and it is difficult to completely evaporate and remove the organic solvent from the sizing agent solution. Also in a case where the organic solvent remains in the sizing agent solution, the hardening of the matrix resin may be inhibited, so that the strength and the heat resistance of the structure may be deteriorated.

In Japanese Laid-Open Patent Publication No. 2006-249395, the matrix material is a mixture of the epoxy resin and the different resin (such as the vinyl ester resin) as described above. In a case where different types of the resins are mixed, for example, the resins may be poor in compatibility with each other and may exhibit disadvantageously different molding shrinkage ratios. Consequently, the resultant structure may be easily cracked, so that it is difficult to sufficiently improve the strength and the like.

Meanwhile, for example, in a case where a void is formed in the structure, the void may act as a fracture origin which causes deterioration in a property such as the strength of the structure. Therefore, it is necessary to prevent the void formation in the structure to obtain an excellent property. However, because the organic fiber has a higher hygroscopic property as compared with inorganic fibers, water contained in the organic fiber is often vaporized in the matrix material to generate air bubbles in the step of molding the prepreg containing the organic fiber under heat and pressure. When the matrix material containing the air bubbles is hardened, the voids remain in the structure.

In order to prevent the void formation in the structure, the viscosity of the matrix material may be lowered to facilitate transfer of the air bubbles in the step of molding under heat and pressure. In this case, the air bubbles can be discharged before the matrix material is hardened. However, when the viscosity of the matrix material is excessively lowered, the matrix material may flow out from the prepreg. As a result, the matrix material is lacked in the prepreg, whereby it is difficult to obtain the structure with a desired molding dimension (thickness) or a sufficiently improved property. Thus, in the structure containing the organic fiber as the reinforcing fiber, it is difficult to achieve both of the void prevention and the desired molding dimension, thereby sufficiently improving the property.

In the above-described epoxy resin composition described in Japanese Laid-Open Patent Publication No. 2003-321557, the void prevention and the molding dimension control are not considered at all in the structure using the organic fiber as the reinforcing fiber. Therefore, the structure may fail to be excellent in a property such as the strength. As described above, the epoxy resin composition is the mixture of the epoxy resins and the thermoplastic resin. In a case where different types of the resins are mixed, for example, the resins may be poor in compatibility with each other and may exhibit disadvantageously different molding shrinkage ratios. Consequently, the resultant structure may be easily cracked, so that it is difficult to sufficiently improve the strength and the like.

A principal object of the present invention is to provide a matrix material that can be used for easily forming an excellent prepreg.

Another object of the present invention is to provide a matrix material capable of easily and inexpensively increasing adhesion to a carbon fiber.

A further object of the present invention is to provide a matrix material capable of effectively improving a strength property or the like of a carbon fiber-reinforced composite structure.

A still further object of the present invention is to provide a matrix material capable of achieving both of void prevention and desired molding dimension.

A still further object of the present invention is to provide a matrix material, free from resins other than epoxy resins, capable of effectively improving properties such as strength and heat resistance of an organic fiber-reinforced composite structure.

According to a first aspect of the present invention, there is provided a matrix material for a carbon fiber-reinforced composite comprising a matrix resin, wherein the matrix resin contains both of a first epoxy resin and a second epoxy resin or only the first epoxy resin, and further contains a third epoxy resin, the first epoxy resin contains a polyfunctional glycidylamine-type epoxy resin having four epoxy groups in one molecule, the second epoxy resin contains at least one of a p-aminophenol-type epoxy resin having three epoxy groups in one molecule and a tetramethylbiphenol-type solid epoxy resin having two epoxy groups in one molecule, the third epoxy resin contains a bisphenol A-type epoxy resin having two epoxy groups in one molecule and having a weight-average molecular weight of 8000, and the matrix resin has an average epoxy equivalent weight of 109 to 162, which is calculated using the following equation (A):

> the average epoxy equivalent weight of the matrix resin=100/[(the weight percentage of the first epoxy resin [phr]/106)+(the weight percentage of the *p*-aminophenol-type epoxy resin [phr]/92)+(the weight percentage of the tetramethylbiphenol-type solid epoxy resin [phr]/177)+(the weight percentage of the third epoxy resin [phr]/1000)]   (A)

In the matrix material of the present invention, the first epoxy resin and the second epoxy resin each have a main chain skeleton with a lower molecular weight between the epoxy groups and a higher aromatic ring content as compared with conventional epoxy resins. Therefore, the molecules of the first epoxy resin and the second epoxy resin are rigid, so that the matrix material can have a higher strength after hardening.

Furthermore, by using the first epoxy resin and the like, the average epoxy equivalent weight of the matrix resin can be effectively reduced. Thus, the matrix material can have a large number of the epoxy groups for forming chemical bonds on a surface of a carbon fiber, and can exhibit an improved adhesive strength to the carbon fiber.

As described above, the third epoxy resin contains the epoxy resin having a relatively high weight-average molecular weight of 8000. Therefore, by using the third epoxy resin, the viscosity of the matrix material in the softened state (which may be referred to simply as the viscosity of the matrix material) can be effectively prevented from being excessively lowered, and the viscosity can be easily controlled to an appropriate range.

The matrix material of the first aspect contains both of the first epoxy resin and the second epoxy resin or only the first epoxy resin, and further contains the third epoxy resin, in such a manner that the matrix resin has an average epoxy equivalent weight of 109 to 162.

In this description, the term "epoxy equivalent weight" means a value obtained by dividing the molecular weight of an epoxy resin by the epoxy group number of one molecule of the epoxy resin. Thus, when the matrix resin has a lower epoxy equivalent weight (average epoxy equivalent weight), the epoxy resins have a larger number of the epoxy groups per unit weight, and the epoxy resins tend to exhibit a lower viscosity.

Therefore, the viscosity of the matrix material can be controlled at an appropriate value by controlling the average epoxy equivalent weight within the above range. Consequently, by controlling the viscosity in this manner, the matrix material can exhibit a preferred viscosity in all the processes for preparing a resin film, a prepreg, a carbon fiber-reinforced composite (CFRP) structure, etc.

Specifically, in the process for preparing the resin film, the resin film can be easily prepared with a desired thickness (resin amount) by applying the matrix material in the softened state to a release paper. Furthermore, the resin film can be prevented from flowing out from the release paper, whereby the thickness (resin amount) of the resin film can be easily maintained.

In addition, the resin film can be prevented from excessively adhering to another member or the like. Therefore, for example, in the step of winding the release paper around a wind-up roll or the like, the resin film can be prevented from adhering to the release paper. Thus, the handling property of the release paper can be improved.

In the process for preparing the prepreg, in the step of bringing the carbon fiber into contact with the resin film and pressing the carbon fiber between the release papers, the matrix material can be sufficiently introduced into the inside of the carbon fiber. Furthermore, the introduced matrix material can be prevented from flowing out from the carbon fiber.

Consequently, a satisfactory amount of the matrix material can be sufficiently introduced into the inside of the carbon fiber to achieve a good property in the prepreg. Furthermore, the matrix material can be prevented from excessively adhering to another member or the like, so that the handling property of the prepreg can be improved.

In the process for preparing the structure, in the step of molding the prepreg under heat and pressure, the prepreg can be accurately molded, and the structure can be prepared easily and efficiently. Furthermore, since a satisfactory amount of the matrix material can be sufficiently introduced to obtain the excellent prepreg as described above, the strength property or the like of the resultant structure can be effectively improved.

As described above, the matrix material, which has a large number of the epoxy groups for forming chemical bonds on a surface of the carbon fiber, can exhibit an improved adhesive strength to the carbon fiber. However, when the epoxy equivalent weight is excessively increased, the epoxy resin tends to exhibit a lowered wettability on the surface of the carbon fiber due to the increased viscosity. Therefore, the contact area between the carbon fiber surface and the epoxy resin is reduced, so that it is difficult to increase the adhesive strength therebetween. Thus, the epoxy group number per unit weight has to be well-balanced with the viscosity of the matrix material to improve the adhesion between the matrix material and the carbon fiber.

In the matrix material of the first aspect, the matrix resin has an average epoxy equivalent weight controlled within the above range, whereby the epoxy group number per unit weight can be well-balanced with the viscosity of the matrix material.

Thus, the contact area between the carbon fiber surface and the matrix material can be increased, and the chemical bonds can be desirably formed from the epoxy groups at the interface therebetween. Consequently, the adhesive strength between the carbon fiber and the matrix material can be further increased at the interface therebetween.

In addition, when the epoxy resin has a larger epoxy group number, the epoxy resin exhibits a lower toughness though the hardening strength is increased. In the matrix material, since the average epoxy equivalent weight of the matrix resin is controlled within the above range, also the hardening strength and the toughness (impact resistance) can be well-balanced.

As a result, in the CFRP structure prepared from the matrix material and the carbon fiber, the strength reduction in a particular direction due to anisotropic property can be suppressed, and the strength of the entire structure can be effectively improved. In addition, the structure can be excellent in another property such as heat resistance or impact resistance.

The structure having such excellent properties can be produced using the matrix material without applying an additional sizing agent to the carbon fiber surface. Therefore, a complicated process and an increased cost are not required in the production of the structure.

As described above, the matrix resin contains only the epoxy resins and is free of resins other than the epoxy resins (different types of resins). Therefore, unlike the case where different types of resins are mixed, the molding shrinkage ratios of the resins in the matrix resin are not largely different, and the compatibility of the resins with each other is not deteriorated. Consequently, inhibition of the resin hardening, cracking of the structure, and the like can be prevented, and the strength and the heat resistance of the structure can be advantageously improved.

Accordingly, by using the matrix material of the first aspect, the prepreg can be prepared easily and desirably, and the adhesion to the carbon fiber can be increased easily and inexpensively. Therefore, the structure can be produced by accurately molding the desired prepreg, and the strength, the heat resistance, the impact resistance, and the like of the structure can be sufficiently improved. Consequently, the resultant structure can be suitably used as a member of an aircraft. Thus, an aircraft member can be provided with high reliability in this invention.

In the matrix material, it is preferred that the matrix resin contains 20 to 70 phr of the first epoxy resin, 20 to 75 phr of the second epoxy resin, and 5 to 20 phr of the third epoxy resin. In this case, the average epoxy equivalent weight of the matrix resin can be easily controlled within the range of 109 to 162 in the step of mixing the first to third epoxy resins to obtain the above properties of the matrix material.

In the matrix material, it is preferred that the polyfunctional glycidylamine-type epoxy resin is represented by the following structural formula (1), the p-aminophenol-type epoxy resin is represented by the following structural formula (2), the tetramethylbiphenol-type solid epoxy resin is represented by the following structural formula (3), the bisphenol A-type epoxy resin is represented by the following structural formula (4), and the matrix resin contains 80 to 95 phr of an epoxy resin mixture of the polyfunctional glycidylamine-type epoxy resin and at least one of the p-aminophenol-type epoxy resin and the tetramethylbiphenol-type solid epoxy resin, and further contains 20 to 5 phr of the bisphenol A-type epoxy resin.

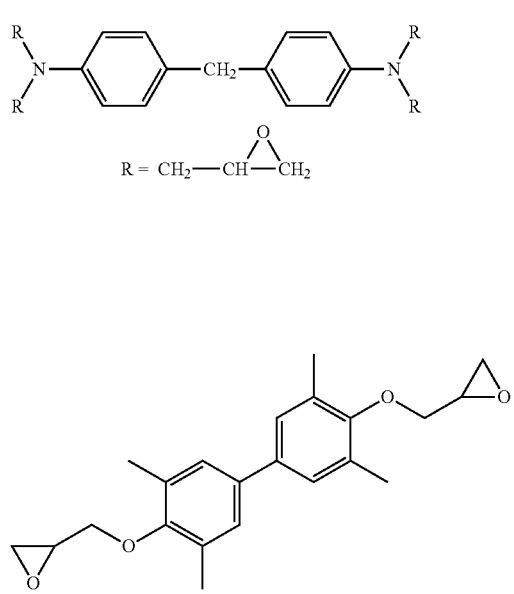

(1)

(2)

(3)

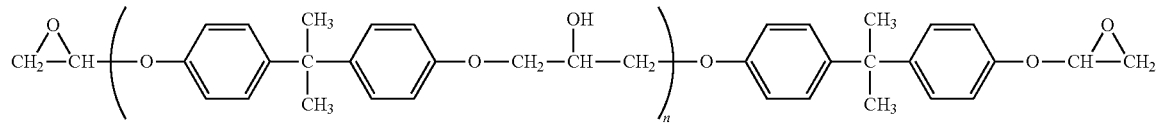

(4)

The term "phr (per hundred resin)" means the weight ratio of each epoxy resin to the total 100 of the matrix resin (the epoxy resins).

The epoxy resins represented by the structural formulae (1) to (3) each have a main chain skeleton with a lower molecular weight between the epoxy groups and have a higher aromatic ring content. Therefore, the matrix material can exhibit a high strength after hardening, and the adhesive strength between the matrix material and the carbon fiber can be increased. Furthermore, the molecular weight of the epoxy resin represented by the structural formula (4) can be increased relatively easily, and the viscosity of the matrix material can be easily controlled within the above appropriate range.

When the content of the third epoxy resin is 5 phr or more, the viscosity of the matrix resin can be prevented from being excessively lowered. When the content of the third epoxy resin is 20 phr or less, the viscosity of the matrix resin can be prevented from being excessively increased. Thus, when the content of the third epoxy resin is 20 to 5 phr, the viscosity of the matrix material can be easily controlled within the appropriate range.

The content of the remaining of the epoxy resin mixture is 80 to 95 phr in the matrix resin. By controlling the content of the epoxy resin mixture within the above range depending on the intended use of the final product of the structure, the adhesive strength can be appropriately increased at the interface between the matrix material and the carbon fiber. Furthermore, also another property such as the viscosity or toughness of the matrix material can be appropriately improved, while the property can be well-balanced with the hardening strength.

It is more preferred that the epoxy resin mixture contains 20 to 70 phr of the polyfunctional glycidylamine-type epoxy resin and 75 to 20 phr of at least one of the p-aminophenol-type epoxy resin and the tetramethylbiphenol-type solid epoxy resin.

It is preferred that the matrix material further contains 41 to 66 parts by weight of a hardener per 100 parts by weight of the matrix resin. In this case, the matrix material can be effectively hardened, and the structure can be efficiently produced with a further improved strength property.

It is preferred that the matrix material has a complex viscosity of 200 to 480 Pa·s at 50° C. The temperature 50° C. is a common temperature at which the matrix material is softened and handled, and the complex viscosity of the matrix material is preferably controlled within this range at this temperature. In this case, both of the impregnation property improvement and flow out prevention can be desirably achieved in the matrix material. Consequently, the matrix material can effectively exhibit a preferred viscosity in all the processes for preparing the resin film, the prepreg, the structure, etc.

It is preferred that the matrix material has an adhesive strength of 77 to 94 MPa to the carbon fiber, which is measured by a microdroplet method. In this case, the strength of the structure can be sufficiently increased even in a particular direction, in which the strength is often relatively lowered due to the anisotropic characteristic. Therefore, the structure exhibits the properties suitably used as the aircraft member.

For example, the microdroplet method for measuring the adhesive strength may contain a composite interface property evaluation method described in Japanese Laid-Open Patent Publication No. 8-334455. Thus, after the matrix material is attached to one carbon fiber and hardened, the adhesive strength may be calculated from a shear force required for isolating the matrix material.

The strength of the structure in the particular direction, which is often relatively lowered due to the anisotropic characteristic, can be easily and efficiently evaluated by the microdroplet method. In general, in a case where the strength of the structure is directly evaluated in the particular direction (such as a direction perpendicular to the carbon fiber direction or a stacking direction), it is necessary to actually produce the structure. In contrast, in the case of using the microdroplet method, a measurement sample can be obtained only by applying the matrix material to one carbon fiber and by hardening the applied matrix material as described above. Therefore, it is not necessary to actually produce the prepreg or the structure, and the evaluation can be easily carried out in a short time.

According to a second aspect of the present invention, there is provided a matrix material for an organic fiber-reinforced composite comprising a matrix resin, wherein the matrix resin contains a first epoxy resin (described below as a fourth epoxy resin) and a second epoxy resin (described below as a fifth epoxy resin), the first epoxy resin (fourth epoxy resin) contains a polyfunctional glycidylamine-type epoxy resin having four epoxy groups in one molecule, the second epoxy resin (fifth epoxy resin) contains a first bisphenol A-type epoxy resin having two epoxy groups in one molecule and having a weight-average molecular weight of 380, and further contains a second bisphenol A-type epoxy resin having two epoxy groups in one molecule and having a weight-average molecular weight of 900, and the matrix resin has an average epoxy equivalent weight of 140 to 196, which is calculated using the following equation (a):

the average epoxy equivalent weight of the matrix resin=100/[(the weight percentage of the first epoxy resin (fourth epoxy resin) [phr]/106)+(the weight percentage of the first bisphenol $A$-type epoxy resin [phr]/190)+(the weight percentage of the second bisphenol $A$-type epoxy resin [phr]/475)]   (a)

The matrix material of the second aspect contains the first epoxy resin (fourth epoxy resin) and the second epoxy resin (fourth epoxy resin) in such a manner that the matrix resin has an average epoxy equivalent weight of 140 to 196. In this description, as described above, the term "epoxy equivalent weight" means a value obtained by dividing the molecular weight of an epoxy resin by the epoxy group number of one molecule of the epoxy resin. Thus, when the matrix resin has a lower epoxy equivalent weight (average epoxy equivalent weight), the epoxy resins have a larger number of the epoxy groups per unit weight, and the epoxy resins tend to exhibit a lower viscosity.

Therefore, the viscosity of the matrix material can be controlled in an appropriate range by using the average epoxy equivalent weight within the above range. In a prepreg prepared by impregnating an organic fiber with the matrix material having the controlled viscosity, air bubbles can be easily transferred and discharged from the matrix material in the step of molding under heat and pressure. Consequently, void formation in the resultant structure can be effectively prevented.

Furthermore, the matrix material can be prevented from excessively flowing out from the above prepreg in the step of molding under heat and pressure. Therefore, the prepreg containing a sufficient amount of the matrix material can be accurately molded to obtain the structure with a desired molding dimension (thickness). Consequently, by using the matrix material, both of the void prevention and the desired molding dimension can be achieved to produce the organic fiber-reinforced composite structure with high strength and quality.

In addition, as described above, in the matrix material, the matrix resin contains only the epoxy resins and is free of resins other than the epoxy resins (different types of resins). Therefore, unlike the case where different types of resins are mixed, the molding shrinkage ratios of the resins in the matrix resin are not largely different, and the compatibility of the resins with each other is not deteriorated. As a result, inhibition of the resin hardening, cracking of the structure, and the like can be prevented.

Consequently, by using the matrix material of the second aspect, the resultant structure containing the organic fiber-reinforced resin can advantageously exhibit an improved property such as high strength or heat resistance.

In the matrix material, it is preferred that the matrix resin contains 20 to 60 phr of the first epoxy resin (fourth epoxy resin) and 40 to 80 phr of the second epoxy resin (fifth epoxy resin). In this case, the average epoxy equivalent weight of the matrix resin can be easily controlled within the range of 140 to 196 in the step of mixing the first and second epoxy resins (fourth and fifth epoxy resins) to obtain the matrix material with the excellent viscosity.

In the matrix material, it is preferred that the polyfunctional glycidylamine-type epoxy resin is represented by the following structural formula (5), the first bisphenol A-type epoxy resin is represented by the following structural formula (6), the second bisphenol A-type epoxy resin is represented by the following structural formula (7), and the matrix resin contains 20 to 60 phr of the polyfunctional glycidylamine-type epoxy resin and 80 to 40 phr of the first bisphenol A-type epoxy resin and the second bisphenol A-type epoxy resin.

When the content of the first epoxy resin (fourth epoxy resin) is 20 phr or more, the viscosity of the matrix resin can be prevented from being excessively lowered. Therefore, the matrix material can be prevented from flowing out from the organic fiber, and the lack of the matrix material in the prepreg can be avoided. On the other hand, when the content of the first epoxy resin (fourth epoxy resin) is 60 phr or less, the viscosity of the matrix resin can be prevented from being excessively increased. Therefore, the air bubbles in the matrix material can be prevented from remaining in the structure.

Thus, when the content of the first epoxy resin (fourth epoxy resin) is 20 to 60 phr, the viscosity of the matrix material can be easily controlled within the appropriate range. Consequently, the void formation can be prevented, and the molded structure can be produced with a desired dimension.

In the matrix material, it is preferred that the matrix resin contains 20 to 60 phr of the first bisphenol A-type epoxy resin and 20 to 45 phr of the second bisphenol A-type epoxy resin. When the content of the first epoxy resin (fourth epoxy resin) is within the above range, the content of the other resin, i.e., the second epoxy resin (fifth epoxy resin) is 80 to 40 phr in the matrix resin. In the case of controlling the ratios of the first and second bisphenol A-type epoxy resins in the second epoxy resin (fifth epoxy resin) within the above range depending on the intended use of the final product of the structure, the structure with an excellent property can be easily produced.

In the matrix material, it is preferred that 30 to 43 parts by weight of a hardener is added to 100 parts by weight of the matrix resin. In this case, the matrix material can be effectively hardened, and the structure can be efficiently produced with a further improved strength property or the like.

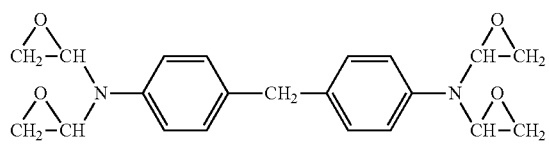

(5)

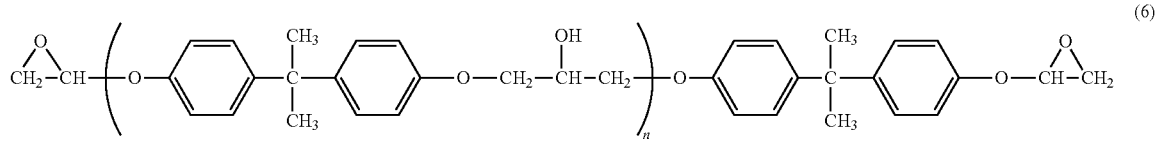

(6)

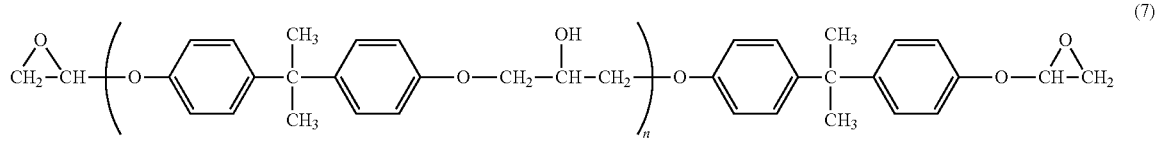

(7)

The term "phr (per hundred resin)" means the weight ratio of each epoxy resin to the total 100 of the matrix resin (the first/fourth and second/fifth epoxy resins).

The first epoxy resin (fourth epoxy resin) represented by the structural formula (5) has a main chain skeleton with a lower molecular weight between the epoxy groups and a higher aromatic ring content. Therefore, the matrix material can have a higher strength after hardening. Furthermore, the viscosity of the matrix material can be relatively easily controlled in the case of using the second epoxy resin (fifth epoxy resin) represented by the structural formulae (6) and (7).

In the matrix material, it is preferred that the matrix material has an adhesive strength of 77 to 94 MPa to the organic fiber, which is measured by a microdroplet method. In this case, the strength of the structure can be sufficiently increased even in a particular direction, in which the strength is often relatively lowered due to the anisotropic characteristic. Therefore, the structure can be produced with a property suitable for use in an aircraft member.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a table showing relationships between the composition ratios of epoxy resins and a hardener, the average epoxy equivalent weight of a matrix resin, the complex viscosity (Pa·s) at 50° C., and the adhesive strength (shear strength τ) on a carbon fiber A measured by a microdroplet method, in each of matrix materials of Examples 1 to 7 according to a first embodiment and Comparative Example 1;

FIG. 2 is a table showing relationships between the composition ratios of epoxy resins and a hardener, the average epoxy equivalent weight of a matrix resin, the complex viscosity (Pa·s) at 50° C., and the shear strength τ on a carbon fiber B, in each of matrix materials of Examples 8 to 16 according to the first embodiment and Comparative Example 2;

FIG. 3 is a table showing a relationship between the composition ratios of an epoxy resin and a hardener, the epoxy equivalent weight, the complex viscosity (Pa·s) at 50° C., and the shear strength τ on the carbon fiber A or B, in a matrix material of Comparative Example 3;

FIG. 4 is a table showing the composition ratios of a fourth epoxy resin (first epoxy resin), a fifth epoxy resin (second epoxy resin), and a hardener and the average epoxy equivalent weight of a matrix resin, in each of matrix materials a to d according to a second embodiment;

FIG. 5 is a graph showing relationships between the storage elastic modulus E' (Pa), the loss elastic modulus E" (Pa), and the loss angle δ (rad) with elapsed time (minutes) after the temperature reaches a molding temperature, determined by dynamic viscoelasticity measurement at the molding temperature, in the matrix material a; and FIG. 6 is a table showing the seven pressurization start time points for each of the matrix materials a to d determined based on the loss angles δ, the number of defects detected in a non-destructive test in each of structures C1 to C7, which are produced by pressing prepregs C containing an aramid fiber as an organic fiber at the seven time points respectively, and the results of thickness measurement.

DESCRIPTION OF THE PREFERRED EMBODIMENTS

Figure 5:
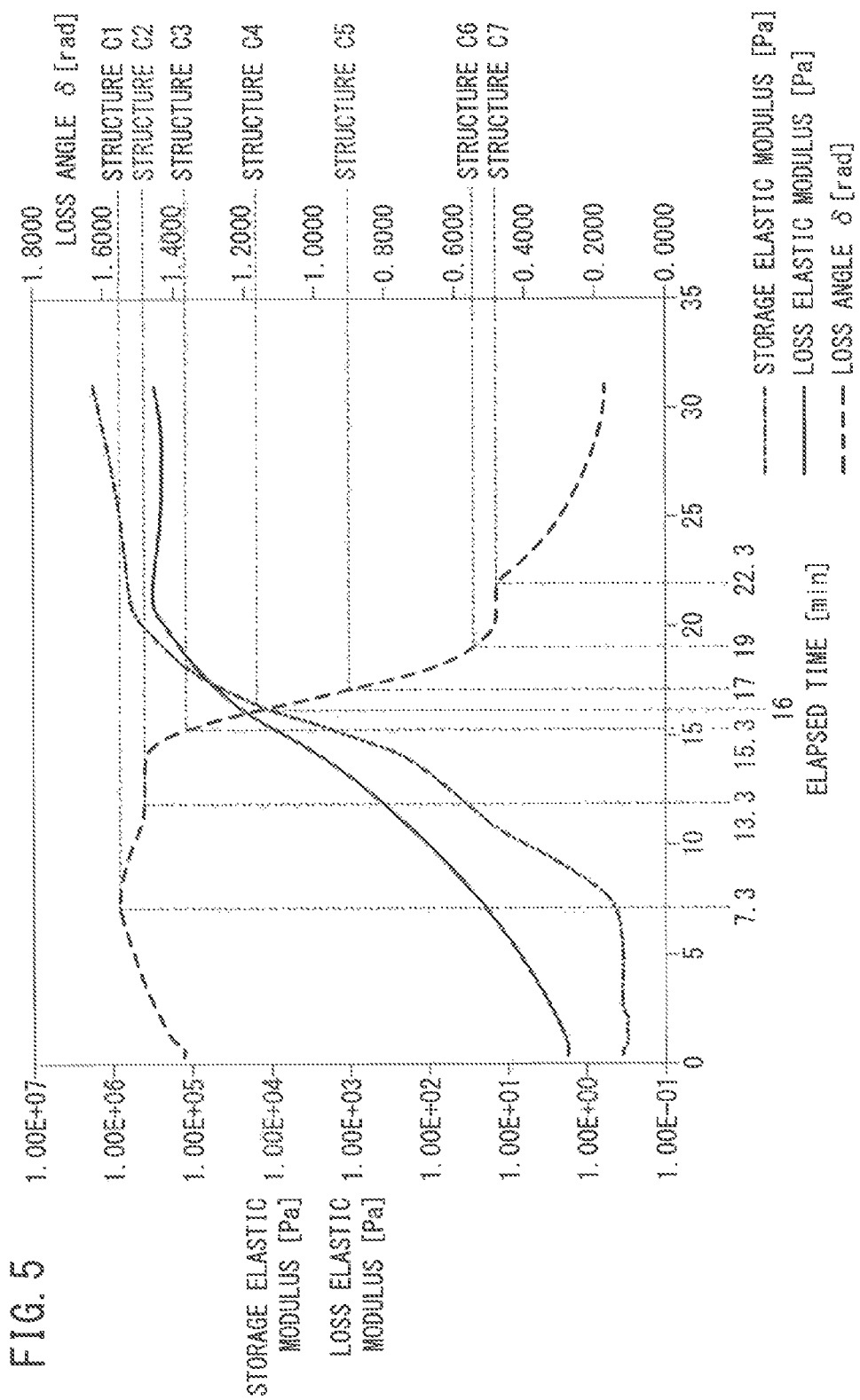

Several preferred embodiments of the matrix material of the present invention will be described in detail below with reference to the accompanying drawings.

A matrix material according to a first embodiment contains a matrix resin and a hardener added thereto, and is used for a carbon fiber-reinforced composite (or a carbon fiber-reinforced plastic CFRP). Thus, a CFRP structure can be produced by the steps of impregnating a carbon fiber with the matrix material to prepare a prepreg, stacking a plurality of the prepregs, molding the stack under heat and pressure, and hardening the matrix material.

The matrix material contains the matrix resin as a resin component as described above. In the first embodiment, the matrix resin contains only epoxy resins, which include both of a first epoxy resin and a second epoxy resin or only the first epoxy resin and further include a third epoxy resin. Thus, the matrix resin contains the first epoxy resin and the third epoxy resin as essential components. The matrix resin has an average epoxy equivalent weight of 109 to 162 as described hereinafter.

The first epoxy resin contains a polyfunctional glycidylamine-type epoxy resin having four epoxy groups in one molecule. Preferred examples of such polyfunctional glycidylamine-type epoxy resins include tetraglycidyldiaminodiphenylmethane represented by the following structural formula (1). A commercially available product such as ARALDITE MY 721 (trade name, available from Huntsman Advanced Materials) may be used as the resin.

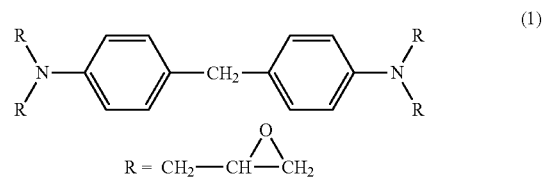

The first epoxy resin has a main chain skeleton with a lower molecular weight between the epoxy groups and has a higher aromatic ring content as compared with conventional epoxy resins. Thus, the first epoxy resin has a relatively rigid molecular structure, has a lower epoxy equivalent weight, and thereby exhibits an excellent hardening strength.

The matrix resin may further contain the second epoxy resin. In this case, the average epoxy equivalent of the matrix resin can be easily and effectively controlled within the above range. The second epoxy resin has a molecular structure with an excellent hardening strength similar to that of the first epoxy resin.

The second epoxy resin contains at least one of a p-aminophenol-type epoxy resin having three epoxy groups in one molecule and a tetramethylbiphenol-type solid epoxy resin having two epoxy groups in one molecule.

Preferred examples of such p-aminophenol-type epoxy resins include N,N-bis(oxiranylmethyl)-4-(oxiranylmethoxy)aniline represented by the following structural formula (2). A commercially available product such as JER630 (trade name, available from Mitsubishi Chemical Corporation) may be used as the resin.

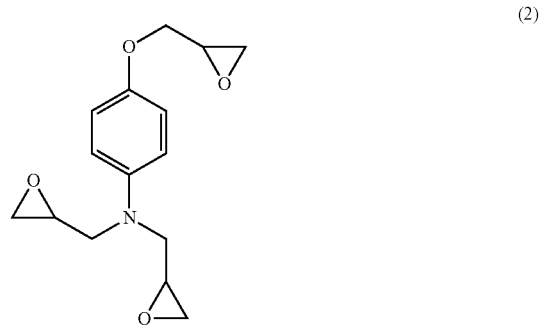 [SMILES: c1cc(N(CC2CO2)CC2CO2)ccc1OCC1CO1]

Preferred examples of such tetramethylbiphenol-type solid epoxy resins include 3,3',5,5'-tetramethyl-4,4-bis(glycidyloxy)-1,1'-biphenyl represented by the following structural formula (3). A commercially available product such as YX4000 (trade name, available from Mitsubishi Chemical Corporation) may be used as the resin.

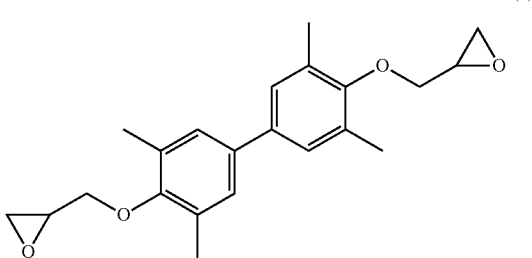

(3)

The third epoxy resin contains a bisphenol A-type epoxy resin having two epoxy groups in one molecule (polymer molecule) and having a weight-average molecular weight of 8000. Preferred examples of such bisphenol A-type epoxy resins include a polycondensation product of 4,4'-isopropylidenediphenol and 1-chloro-2,3-epoxypropane represented by the following structural formula (4). A commercially available product such as JER1006FS (trade name, available from Mitsubishi Chemical Corporation) may be used as the resin.

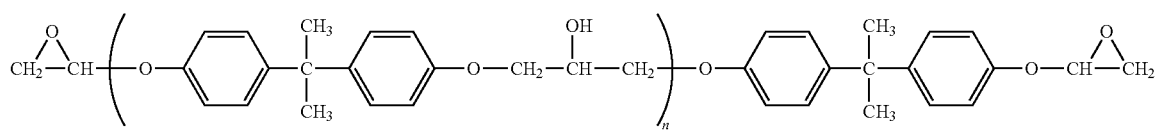

(4)

As described above, the third epoxy resin contains the epoxy resin having a relatively high weight-average molecular weight of 8000. Therefore, by controlling the content of the third epoxy resin, the viscosity of the matrix material in the softened state (which may be referred to simply as the viscosity of the matrix material) can be effectively prevented from being excessively lowered, and the viscosity can be easily controlled to an appropriate range.

The matrix material of the first embodiment contains both of the first epoxy resin and the second epoxy resin or only the first epoxy resin and further contains the third epoxy resin in such a manner that the matrix resin has an average epoxy equivalent weight of 109 to 162.

Specifically, the average epoxy equivalent weight of the matrix resin (the epoxy resins) can be calculated using the following equation (A):

the average epoxy equivalent weight of the matrix resin=100/[(the weight percentage of the first epoxy resin [phr]/106)+(the weight percentage of the p-aminophenol-type epoxy resin [phr]/92)+(the weight percentage of the tetramethyl-biphenol-type solid epoxy resin [phr]/177)+(the weight percentage of the third epoxy resin [phr]/1000)]     (A)

In a case where the matrix resin contains only the first epoxy resin and the third epoxy resin, the weight percentages of the p-aminophenol-type epoxy resin and the tetramethylbiphenol-type solid epoxy resin are 0. Therefore, in this case, the average epoxy equivalent weight of the matrix resin is calculated from the epoxy equivalent weights and the weight percentages of the first epoxy resin and the third epoxy resin.

The epoxy equivalent weight of the first epoxy resin is a value obtained by dividing the molecular weight of the polyfunctional glycidylamine-type epoxy resin by 4. The epoxy equivalent weight of the third epoxy resin is a value obtained by dividing the molecular weight of the bisphenol A-type epoxy resin by 2. The weight percentage means the weight ratio of the epoxy resin to the total 100% of the matrix resin, i.e. phr (per hundred resin). Thus, when the epoxy resin has a lower epoxy equivalent weight (average epoxy equivalent weight), the epoxy resin (in the matrix resin) has a larger number of epoxy groups per unit weight and has a lower viscosity.

An example of average epoxy equivalent weight calculation will be described below. In this example, the matrix resin contains 30 phr of the tetraglycidyldiaminodiphenylmethane having an epoxy equivalent weight of 106 (the first epoxy resin), 30 phr of the N,N-bis(oxiranylmethyl)-4-(oxiranylmethoxy)aniline having an epoxy equivalent weight of 92 (the second epoxy resin), 30 phr of the 3,3',5,5'-tetramethyl-4,4-bis(glycidyloxy)-1,1'-biphenyl having an epoxy equivalent weight of 177 (the second epoxy resin), and 10 phr of the polycondensation product of 4,4'-isopropylidenediphenol and 1-chloro-2,3-epoxypropane having an epoxy equivalent weight of 1000 (the third epoxy resin).

The average epoxy equivalent weight of the matrix resin is calculated using the equation (A) as follows:

the average epoxy equivalent weight of the matrix resin=100/[(30/106)+(30/92)+(30/177)+(10/1000)]≈127

In the first embodiment, the types and amounts of the first epoxy resin, the second epoxy resin, and the third epoxy resin are controlled respectively, whereby the average epoxy equivalent weight of the matrix resin is controlled within the range of 109 to 162. Thus, the viscosity of the matrix material can be controlled at an appropriate value. Consequently, by controlling the viscosity in this manner, the matrix material can exhibit a preferred viscosity in all the processes for preparing a resin film, the prepreg, the carbon fiber-reinforced composite (CFRP) structure, etc.

Specifically, in the process for preparing the resin film, the resin film can be easily prepared with a desired thickness (resin amount) by applying the matrix material in the softened state to a release paper. Furthermore, the resin film can be prevented from flowing out from the release paper, whereby the thickness (resin amount) of the resin film can be easily maintained.

In addition, the resin film can be prevented from excessively adhering to another member or the like. Therefore, for example, in the step of winding the release paper around a wind-up roll or the like, the resin film can be prevented from adhering to the release paper. Thus, the handling property of the release paper can be improved.

In the process for preparing the prepreg, in the step of bringing the carbon fiber into contact with the resin film and pressing the carbon fiber between the release papers, the matrix material can be sufficiently introduced into the inside of the carbon fiber. Furthermore, the introduced matrix material can be prevented from flowing out from the carbon fiber.

Consequently, a satisfactory amount of the matrix material can be sufficiently introduced into the inside of the carbon fiber to achieve a good property in the prepreg. Furthermore, the matrix material can be prevented from excessively adhering to another member or the like, so that the handling property of the prepreg can be improved.

In the process for preparing the structure, in the step of molding the prepreg under heat and pressure, the prepreg can be accurately molded, and the structure can be prepared easily and efficiently. Furthermore, since a satisfactory amount of the matrix material can be sufficiently introduced to obtain the excellent prepreg as described above, the strength property or the like of the resultant structure can be effectively improved.

As described above, the matrix material, which has a large number of the epoxy groups for forming chemical bonds on a surface of the carbon fiber, can exhibit an improved adhesive strength to the carbon fiber. However, when the epoxy equivalent weight is excessively increased, the epoxy resin tends to exhibit a lowered wettability on the surface of the carbon fiber due to the increased viscosity. Therefore, the contact area between the carbon fiber surface and the epoxy resin is reduced, so that it is difficult to increase the adhesive strength therebetween. Thus, the epoxy group number per unit weight has to be well-balanced with the viscosity of the matrix material to improve the adhesion between the matrix material and the carbon fiber.

In the matrix material of the first embodiment, the matrix resin has an average epoxy equivalent weight controlled within the above range, whereby the epoxy group number per unit weight can be well-balanced with the viscosity of the matrix material.

Thus, the contact area between the carbon fiber surface and the matrix material can be increased, and the chemical bonds can be desirably formed from the epoxy groups at the interface therebetween. Consequently, the adhesive strength between the carbon fiber and the matrix material can be further increased at the interface therebetween.

In addition, when the epoxy resin has a larger epoxy group number, the epoxy resin exhibits a lower toughness though the hardening strength is increased. In the matrix material, since the average epoxy equivalent weight of the matrix resin is controlled within the above range, also the hardening strength and the toughness (impact resistance) can be well-balanced.

As a result, in the CFRP structure prepared from the matrix material and the carbon fiber, the strength reduction in a particular direction due to anisotropic property can be suppressed, and the strength of the entire structure can be effectively improved. In addition, the structure can be excellent in another property such as heat resistance or impact resistance.

The structure having such excellent properties can be produced using the matrix material without applying an additional sizing agent to the carbon fiber surface. Therefore, a complicated process and an increased cost are not required in the production of the structure.

As described above, the matrix resin contains only the epoxy resins and is free of resins other than the epoxy resins (different types of resins). Therefore, unlike the case where different types of resins are mixed, the molding shrinkage ratios of the resins in the matrix resin are not largely different, and the compatibility of the resins with each other is not deteriorated. Consequently, inhibition of the resin hardening, cracking of the structure, and the like can be prevented, and the strength and the heat resistance of the structure can be advantageously improved.

In the matrix material, it is preferred that the matrix resin contains 20 to 70 phr of the first epoxy resin, 20 to 75 phr of the second epoxy resin, and 5 to 20 phr of the third epoxy resin. In this case, the average epoxy equivalent weight of the matrix resin can be easily controlled within the range of 109 to 162.

Thus, the viscosity of the matrix material can be easily controlled within the above appropriate range, and the prepreg can be prepared easily and desirably. Furthermore, the excessive increase in the epoxy group number and thus the excessive increase in the crosslink density of the matrix material can be prevented, so that the embrittlement of the matrix material can be prevented. In addition, the epoxy group number can be sufficiently increased, and the adhesive strength between the carbon fiber and the matrix material can be desirably improved. Consequently, the resultant structure can be excellent in both of the strength property and the toughness.

In the matrix material of the first embodiment, for example, when the first epoxy resin is represented by the structural formula (1), the second epoxy resin is represented by at least one of the structural formulae (2) and (3), and the third epoxy resin is represented by the structural formula (4), it is preferred that the matrix resin contains 80 to 95 phr of an epoxy resin mixture of the first and second epoxy resins and 20 to 5 phr of the third epoxy resin.

When the content of the third epoxy resin is 5 phr or more, the viscosity of the matrix material can be prevented from being excessively lowered. When the content of the third epoxy resin is 20 phr or less, the viscosity of the matrix material can be prevented from being excessively increased. Thus, when the content of the third epoxy resin is 20 to 5 phr, the viscosity of the matrix material can be easily controlled within the appropriate range.

The content of the remaining of the epoxy resin mixture is 80 to 95 phr in the matrix resin. By controlling the content of the epoxy resin mixture within this range, the adhesive strength can be appropriately increased at the interface between the matrix material and the carbon fiber. Furthermore, also another property such as the viscosity or toughness of the matrix material can be appropriately improved, while the property can be well-balanced with the hardening strength. It is more preferred that the epoxy resin mixture contains 20 to 70 phr of the first epoxy resin and 75 to 20 phr of the second epoxy resin.

In the case of using both of the first and second epoxy resins or only the first epoxy resin and further using a third epoxy resin at the above ratio, the average epoxy equivalent weight of the matrix resin can be easily controlled within the range of 109 to 162. As a result, the viscosity of the matrix material can be controlled within an appropriate range. For example, it is preferred that the matrix material has a complex viscosity of 200 to 480 Pa·s at 50° C.

The temperature 50° C. is a common temperature at which the matrix material is softened and handled, and the complex viscosity of the matrix material is preferably controlled within the above range at this temperature. In this case, both of the impregnation property improvement and flow out prevention can be desirably achieved in the matrix material. Consequently, the matrix material can exhibit a preferred viscosity in all the processes for preparing the resin film, the prepreg, the structure, etc.

For example, the carbon fiber may be subjected to an etching treatment or the like and may have a concave-convex surface. In this case, when the viscosity of the matrix material is controlled as described above, the matrix material can be effectively and desirably introduced into the concave-convex shape of the carbon fiber. Therefore, the contact area between the carbon fiber surface and the matrix material can be increased, an anchor effect can be produced therebetween, and the adhesive strength can be further increased.

The hardener contained in the matrix material is not limited as long as it is capable of hardening the epoxy resin. For example, an aromatic polyamine or the like may be used as the hardener. The hardener is preferably composed of 4,4-diaminodiphenylsulfone represented by the following structural formula (8). A commercially available product such as ARADUR 976-1 (trade name, available from Huntsman Advanced Materials) may be used as the hardener.

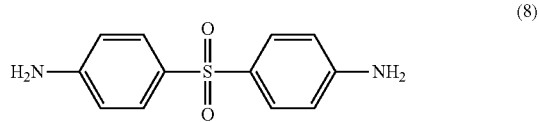 [SMILES: Nc1ccc(S(=O)(=O)c2ccc(N)cc2)cc1]

(8)

Incidentally, ARALDITE, JER, and ARADUR are registered trademarks.

The ratio of the hardener to the matrix resin may be selected depending on the average epoxy equivalent weight of the matrix resin. It is preferred that 41 to 66 parts by weight of the hardener is added to 100 parts by weight of the matrix resin. When the ratio of the hardener is 41 parts by weight or more, the matrix material can be sufficiently hardened. When the ratio of the hardener is 66 parts by weight or less, an unexpected side reaction of the excess hardener can be prevented. Thus, when the ratio of the hardener is controlled within the above range, the structure can be efficiently produced with a further improved strength property, etc.

For example, in a case where the CFRP structure produced from the matrix material is used as an aircraft member or the like, the carbon fiber is preferably a PAN-based fiber having suitable properties such as a low density, a high strength, and a high elasticity. The PAN-based carbon fiber is obtained by carbonizing a PAN (polyacrylonitrile) fiber at a high temperature. The carbon fiber preferably has a tensile strength of 2000 to 7000 MPa, a tensile elastic modulus of 200 to 1000 GPa, and a density of 1.5 to 2.5 g/cm$^3$.

The adhesive strength between the matrix material and the carbon fiber, measured by a microdroplet method, is preferably 77 to 94 MPa. When the adhesive strength is within this range, the hardened matrix material can exhibit a sufficient strength, whereby the structure can be used in various fields. When the adhesive strength is 77 MPa or more, the adhesion between the matrix material and the fiber can be sufficiently increased, and breakage at the interface therebetween can be effectively prevented. On the other hand, when the adhesive strength is 94 MPa or less, it is not necessary to significantly increase the epoxy group number and the crosslink density of the matrix material, and thus the toughness reduction of the structure can be prevented.

For example, the microdroplet method for measuring the adhesive strength may be a composite interface property evaluation method described in Japanese Laid-Open Patent Publication No. 08-334455.

In this method, both ends of a carbon fiber having a certain length are fixed to a holder, and a melt of the matrix material is attached to the carbon fiber to form a microdroplet.

The holder is placed in a heating furnace or the like, the microdroplet is hardened, and a blade is placed on the carbon fiber. The blade allows displacement of the carbon fiber and inhibits displacement of the microdroplet. Then, one of the blade and the holder is fixed, the other is moved, and a load is applied until the microdroplet is separated from the carbon fiber by the blade. The maximum load applied to the microdroplet in this separation process is measured, and the measured value is divided by the contact area between the microdroplet and the carbon fiber before the measurement, to obtain the adhesive strength (shear strength).

As described above, in the matrix material of the first embodiment, the prepreg can be prepared easily and desirably, and the adhesion between the matrix material and the carbon fiber can be increased inexpensively and easily.

Therefore, the structure can be produced by accurately molding the excellent prepreg, and the structure can have sufficiently improved strength, heat resistance, impact resistance, and the like. Consequently, the structure can be suitable for use in the aircraft member. Thus, the aircraft member with high reliability can be provided in this invention.

A matrix material according to a second embodiment of the present invention will be described below. The matrix material contains a matrix resin and a hardener added thereto, and is suitably used for an organic fiber-reinforced composite containing an organic fiber as a reinforcing fiber. An organic fiber-reinforced composite structure (which may be referred to simply as the structure) can be produced by the steps of impregnating the organic fiber with the matrix material to prepare a prepreg, stacking a plurality of the prepregs, molding the stack under heat and pressure, and hardening the matrix material.

The matrix material contains the matrix resin as a resin component as described above. In the second embodiment, the matrix resin contains only epoxy resins, which include a fourth epoxy resin (first epoxy resin) and a fifth epoxy resin (second epoxy resin). The matrix resin has an average epoxy equivalent weight of 140 to 196 as described hereinafter.

The fourth epoxy resin contains a polyfunctional glycidylamine-type epoxy resin having four epoxy groups in one molecule. Preferred examples of such polyfunctional glycidylamine-type epoxy resins include tetraglycidyl-diaminodiphenylmethane represented by the following structural formula (5). A commercially available product such as ARALDITE MY 721 (trade name, available from Huntsman Advanced Materials) may be used as the resin.

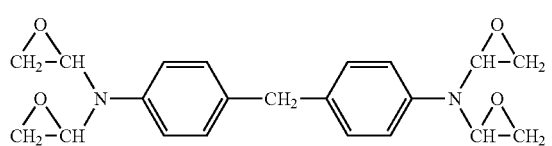

(5)

The fourth epoxy resin has a main chain skeleton with a lower molecular weight between the epoxy groups and has a higher aromatic ring content as compared with conventional epoxy resins. Thus, the fourth epoxy resin has a relatively rigid molecular structure, has a lower epoxy equivalent weight, and thereby exhibits an excellent hardening strength.

The fifth epoxy resin contains a bisphenol A-type epoxy resins having two epoxy groups in one molecule. Specifically, the fifth epoxy resin contains a first bisphenol A-type epoxy resin having a weight-average molecular weight of 380 and a second bisphenol A-type epoxy resin having a weight-average molecular weight of 900.

The first bisphenol A-type epoxy resin is a viscous liquid of a bisphenol A-type epoxy resin represented by the following structural formula (6). A commercially available product such as JER828 (trade name, available from Mitsubishi Chemical Corporation) may be used as the resin. The second bisphenol A-type epoxy resin is a solid of a bisphenol A-type epoxy resin represented by the following structural formula (7). A commercially available product such as JER1001 (trade name, available from Mitsubishi Chemical Corporation) may be used as the resin.

respectively, whereby the average epoxy equivalent weight of the matrix resin is controlled within the range of 140 to 196. Thus, the viscosity of the matrix material can be controlled at an appropriate value. In a prepreg prepared by impregnating an organic fiber with the matrix material having the controlled viscosity, air bubbles can be easily transferred and discharged from the matrix material in the step of molding under heat and pressure. Consequently, void formation in the resultant structure can be effectively prevented.

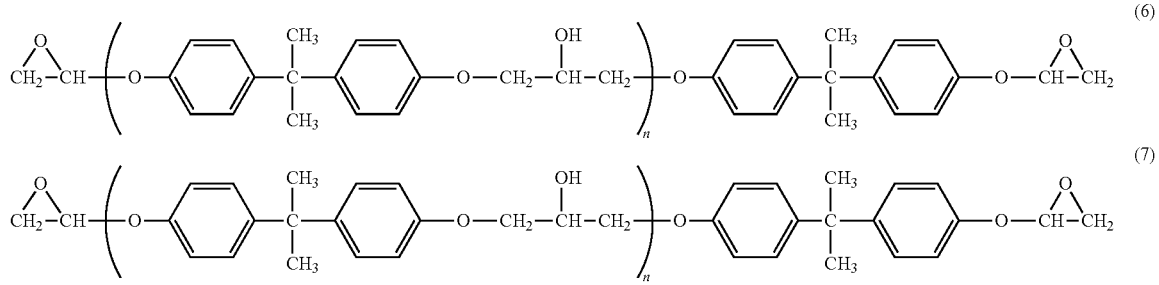

By using the fifth epoxy resin, the viscosity of the matrix material can be controlled relatively easily.

The matrix material of the second embodiment contains the fourth epoxy resin and the fifth epoxy resin in such a manner that the matrix resin has an average epoxy equivalent weight of 140 to 196.

Specifically, the average epoxy equivalent weight of the matrix resin (the epoxy resins) can be calculated using the following equation (a):

the average epoxy equivalent weight of the matrix resin=100/[(the weight percentage of the fourth epoxy resin [phr]/106)+(the weight percentage of the first bisphenol $A$-type epoxy resin [phr]/190)+(the weight percentage of the second bisphenol $A$-type epoxy resin [phr]/475)]  (a)

The epoxy equivalent weight of the fourth epoxy resin is a value obtained by dividing the molecular weight of the polyfunctional glycidylamine-type epoxy resin by 4. The weight percentage means the weight ratio of the epoxy resin to the total 100% of the matrix resin, i.e., phr (per hundred resin). Thus, when the epoxy resin has a lower epoxy equivalent weight (average epoxy equivalent weight), the epoxy resin (in the matrix resin) has a larger number of epoxy groups per unit weight and has a lower viscosity.

An example of average epoxy equivalent weight calculation will be described below. In this example, the matrix resin contains 30 phr of the tetraglycidyldiaminodiphenylmethane having an epoxy equivalent weight of 106 as the fourth epoxy resin, and further contains 40 phr of the first bisphenol A-type epoxy resin having an epoxy equivalent weight of 190 and having a weight-average molecular weight of 380 and 30 phr of the second bisphenol A-type epoxy resin having an epoxy equivalent weight of 475 and having a weight-average molecular weight of 900 as the fifth epoxy resin.

The average epoxy equivalent weight of the matrix resin is calculated using the equation (a) as follows:

the average epoxy equivalent weight of the matrix resin=100/[(30/106)+(40/190)+(30/475)]≈180

In the second embodiment, the types and amounts of the fourth epoxy resin and the fifth epoxy resin are controlled Furthermore, the matrix material can be prevented from excessively flowing out from the above prepreg in the step of molding under heat and pressure. Therefore, the prepreg containing a sufficient amount of the matrix material can be accurately molded to obtain the structure with a desired molding dimension (thickness). Consequently, by using the matrix material, both of the void prevention and the desired molding dimension can be achieved to produce the organic fiber-reinforced composite structure with high strength and quality.

In addition, as described above, in the matrix material, the matrix resin contains only the epoxy resins and is free of resins other than the epoxy resins (different types of resins). Therefore, unlike the case where different types of resins are mixed, the molding shrinkage ratios of the resins in the matrix resin are not largely different, and the compatibility of the resins with each other is not deteriorated. As a result, inhibition of the resin hardening, cracking of the structure, and the like can be prevented.

Consequently, by using the matrix material of the second aspect, the resultant structure containing the organic fiber-reinforced resin can advantageously exhibit an improved property such as high strength or heat resistance.

In a case where the matrix resin contains the fourth and fifth epoxy resins represented by the above structural formulae (5) to (7), it is preferred that the matrix resin contains 20 to 60 phr of the fourth epoxy resin. When the content of the fourth epoxy resin is 20 phr or more, the viscosity of the matrix resin can be prevented from being excessively lowered. Therefore, the matrix material can be prevented from flowing out from the organic fiber, and the lack of the matrix material in the prepreg can be avoided. On the other hand, when the content of the fourth epoxy resin is 60 phr or less, the viscosity of the matrix resin can be prevented from being excessively increased. Therefore, the air bubbles in the matrix material can be prevented from remaining in the structure.

Thus, when the content of the fourth epoxy resin is 20 to 60 phr, the viscosity of the matrix material can be easily controlled within the appropriate range. Consequently, the void formation can be prevented, and the molded structure can be produced with a desired dimension.

When the content of the fourth epoxy resin falls within the above range, the content of the fifth epoxy resin is 80 to 40 phr as the remaining in the matrix resin. In the case of controlling the ratios of the first and second bisphenol A-type epoxy resins in the fifth epoxy resin within the above range depending on the intended use of the final product of the structure, the structure with an excellent property can be easily produced.

The hardener contained in the matrix material is not limited as long as it is capable of hardening the epoxy resin. It is preferred that the hardener contains an aromatic polyamine from the viewpoint of improving mechanical property and heat resistance of the structure. The aromatic polyamine is preferably 4,4-diaminodiphenylsulfone represented by the following structural formula (8). A commercially available product such as ARADUER 976-1 (trade name, available from Huntsman Advanced Materials) may be used as the hardener.

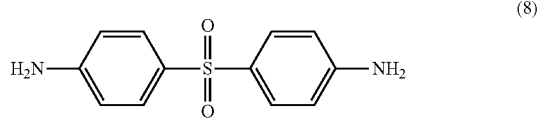 [SMILES: Nc1ccc(S(=O)(=O)c2ccc(N)cc2)cc1]

(8)

The ratio of the hardener to the matrix resin may be selected depending on the average epoxy equivalent weight of the matrix resin. For example, in the case of using the above aromatic polyamine for the hardener, the ratio may be determined in such a manner that the epoxy group number calculated from the epoxy equivalent weight of the resin is equal to the active hydrogen number calculated from the amine equivalent weight of the hardener.

It is preferred that 30 to 43 parts by weight of the hardener is added to 100 parts by weight of the matrix resin. When the ratio of the hardener is 30 parts by weight or more, the matrix material can be sufficiently hardened. When the ratio of the hardener is 43 parts by weight or less, an unexpected side reaction of the excess hardener can be prevented. Thus, when the ratio of the hardener is controlled within the above range, the structure can be efficiently produced with a further improved strength property, etc.

The organic fiber, which is impregnated with the matrix resin, is not limited as long as it can be used as the reinforcing fiber for the fiber-reinforced composite. Examples of the organic fibers include aramid fibers, cellulose fibers, and polyethylene fibers.

For example, in the case of using the structure for an aircraft member or the like, it is preferred that the organic fiber is an aramid fiber from the viewpoint of achieving a high tensile strength, etc. A commercially available product such as KEVLAR 49 (trade name, available from Toray Industries, Inc., tensile strength 3000 MPa, tensile elastic modulus 112 GPa, density 1.44 g/cm$^3$) may be used as the reinforcing fiber.

Incidentally, ARALDITE, JER, ARADUR, and KEVLAR are registered trademarks.

A plurality of bundles of the organic fiber pieces may be arranged parallel to each other to form a UD material. The UD material may be impregnated with the unhardened matrix material to obtain a prepreg sheet. Alternatively, a plurality of the organic fiber bundles or a woven material (cross material) containing the organic fiber pieces woven in the horizontal and vertical directions or in three or more directions may be impregnated with the unhardened matrix material to obtain the prepreg. Furthermore, the prepreg may be cut into width and length of 150 mm or less, and sheets of the prepreg may be oriented in different directions and stacked to produce the structure.

The matrix material preferably has an adhesive strength of 77 to 94 MPa to the organic fiber, which is measured by a microdroplet method. When the adhesive strength is within this range, the hardened matrix material can exhibit a sufficient strength, whereby the structure can be used in various fields. When the adhesive strength is 77 MPa or more, the adhesion between the matrix material and the organic fiber can be sufficiently increased, and breakage at the interface therebetween can be effectively prevented. On the other hand, when the adhesive strength is 94 MPa or less, the crosslink density of the matrix material can be prevented from being excessively increased, and the toughness reduction of the structure can be prevented.

For example, the microdroplet method for measuring the adhesive strength may be a composite interface property evaluation method described in Japanese Laid-Open Patent Publication No. 08-334455.

In this method, both ends of an organic fiber having a certain length are fixed to a holder, and a melt of the matrix material is attached to the organic fiber to form a microdroplet.

The holder is placed in a heating furnace or the like, the microdroplet is hardened, and a blade is placed on the organic fiber. The blade allows displacement of the organic fiber and inhibits displacement of the microdroplet. Then, one of the blade and the holder is fixed, the other is moved, and a load is applied until the microdroplet is separated from the organic fiber by the blade. The maximum load applied to the microdroplet in this separation process is measured, and the measured value is divided by the contact area between the microdroplet and the organic fiber before the measurement, to obtain the adhesive strength (shear strength).

In a specific example of a method for producing the structure from the matrix material and the organic fiber, first, a plurality of prepreg sheets are stacked, placed on a metal molding plate, and formed into a desired shape. The metal molding plate and the prepreg are covered with an airtight bag. This bag has a deaeration port, and the inside of the bag is evacuated by deaeration through the port. The port is sealed while maintaining the inside in the vacuum state, and then the bag is placed in a furnace of an autoclave. The prepreg in the bag can be heated and pressed in the autoclave using a predetermined molding program.

Thus, for example, the prepreg is heated to a molding temperature in the furnace of the autoclave, the molding temperature is maintained, and then the inner pressure of the furnace is increased. The pressurization to the softened prepreg is started in this manner to form the prepreg into the desired shape. Thereafter, the furnace temperature is increased to a temperature at which the hardening reaction of the matrix material is accelerated, and the matrix material is sufficiently hardened. As a result, the structure having the desired shape is produced.

As described above, in the matrix material of the second embodiment, the average epoxy equivalent weight of the matrix resin containing the fourth epoxy resin and the fifth epoxy resin is controlled within the range of 140 to 196. Therefore, the viscosity of the matrix material can be controlled within an appropriate range. Thus, the air bubbles can be easily discharged from the matrix material in the step of molding under heat and pressure, and the matrix material can be prevented from excessively flowing out from the prepreg. Even in the case of using an organic fiber having a high hygroscopic property as the reinforcing fiber in the organic fiber-reinforced composite to produce the structure, the air bubbles can be effectively prevented from remaining in the structure, and the structure can have a desired molding dimension.

The matrix resin in the matrix material contains only the epoxy resins and is free of resins other than the epoxy resins. Therefore, unlike the case where different types of resins are mixed, the molding shrinkage ratios of the resins in the matrix resin are not largely different, and the compatibility of the resins with each other is not deteriorated. Consequently, inhibition of the resin hardening, cracking of the structure, and the like can be prevented.

Accordingly, in the case of using this matrix material, the strength, the heat resistance, and the like of the organic fiber-reinforced resin structure can be effectively improved. The resultant structure can be suitably used as a member of an aircraft. Thus, an aircraft member can be provided with high reliability in this embodiment.

The present invention is not particularly limited to the above embodiments, and various changes and modifications may be made therein without departing from the scope of the invention.

Examples of First Embodiment

Examples 1 to 7 and Comparative Example 1

Araldite MY 721 (available from Huntsman Advanced Materials, hereinafter referred to also as the MY 721) was used as a polyfunctional glycidylamine-type epoxy resin in a first epoxy resin. jER630 and YX4000 (both available from Mitsubishi Chemical Corporation) were used as a p-aminophenol-type epoxy resin and a tetramethylbiphenol-type solid epoxy resin in a second epoxy resin respectively. jER1006FS (available from Mitsubishi Chemical Corporation) was used as a bisphenol A-type epoxy resin in a third epoxy resin. Furthermore, Aradur 976-1 (available from Huntsman Advanced Materials) was used as a hardener.

A matrix resin contained both of the first epoxy resin (MY 721) and the second epoxy resin (jER630 and/or YX4000) or only the first epoxy resin, and further contained the third epoxy resin (jER1006FS). The hardener was added to the matrix resin to prepare a matrix material according to each example. Specifically, matrix materials according to Examples 1 to 7 were prepared by mixing the MY 721, jER630, YX4000, jER1006FS, and hardener at composition ratios shown in FIG. 1 respectively.

Furthermore, a matrix material according to Comparative Example 1 was prepared by mixing the first epoxy resin (MY 721), the second epoxy resin (jER630), and the hardener, without the third epoxy resin (jER1006FS), at composition ratios shown in FIG. 1.

The MY 721, jER630, YX4000, and jER1006FS had epoxy equivalent weights of 106, 92, 177, and 1000, respectively. The average epoxy equivalent weights of the matrix resins of Examples 1 to 7 and Comparative Example 1 were calculated from the epoxy equivalent weights and the composition ratios of the MY 721, jER630, YX4000, and jER1006FS shown in FIG. 1.

The complex viscosities $\eta^*$ (Pa·s) of the matrix materials of Examples 1 to 7 and Comparative Example 1 at 50° C. were measured, and the results are shown in FIG. 1. The measurement was carried out using PHYSICA MCR 301 (trade name, available from Anton Paar) under conditions of a frequency of 1 Hz, an oscillation angle $\gamma$ of 10° A (36 deg), and a temperature increase rate of 3° C./min.

T800SC (trade name, available from Toray Industries, Inc.) was used as a carbon fiber A. The carbon fiber A had a fiber diameter of 5.5 μm, a tensile strength of 5880 MPa, and a tensile elastic modulus of 294 GPa.

The interface adhesive strength (shear strength $\tau$) between the carbon fiber A and each of the matrix materials of Examples 1 to 7 was measured by a microdroplet method. A composite interface property evaluation equipment HM410 (available from Tohei Sangyo Co., Ltd.) was used in this measurement. Specifically, first, both ends of one carbon fiber A were fixed to a holder by an adhesive tape. A melt of the matrix material was attached to the surface of the carbon fiber A by a spatula to form a microdroplet.

The holder was placed in a heating furnace, and the microdroplet was hardened in the air at 180° C. for 2 hours. A blade was placed on the carbon fiber A, and the blade and the holder were moved relatively to each other at a rate of 0.1 mm/min, whereby a tensile load was applied to the microdroplet by the blade. The maximum tensile load F(N) required for separating the microdroplet from the carbon fiber A was measured, and the shear strength $\tau$ (MPa) was calculated based on $F/(\pi DL)$. Incidentally, D represents the diameter (m) of the carbon fiber A, and L represents the fiber adhesion length (m) of the microdroplet.

The above measurement was carried out six times, the average of the measured values was calculated, and the standard deviation was subtracted from the average value to obtain the shear strength $\tau$. The interface adhesive strength between the carbon fiber A and the matrix material was evaluated based on the shear strength $\tau$.

The shear strengths $\tau$ of the matrix materials of Examples 1 to 7 were obtained in the above manner, and are shown in FIG. 1.

Examples 8 to 16 and Comparative Example 2

Matrix materials according to Examples 8 to 16 and Comparative Example 2 were prepared by mixing the MY 721, jER630, YX4000, jER1006FS, and hardener at composition ratios shown in FIG. 2 in the same manner as Examples 1 to 7 and Comparative Example 1. The average epoxy equivalent weights were calculated and the complex viscosities $\eta^*$ (Pa·s) at 50° C. were measured in the matrix materials of Examples 8 to 16 and Comparative Example 2 in the same manner as Examples 1 to 7 and Comparative Example 1.

IMS60 (trade name, available from Toho Tenax Co., Ltd.) was used as a carbon fiber B. The carbon fiber B had a fiber diameter of 5.5 μm, a tensile strength of 5800 MPa, and a tensile elastic modulus of 290 GPa. The interface adhesive strength (shear strength $\tau$) between the carbon fiber B and each of the matrix materials of Examples 8 to 16 was measured by the microdroplet method in the same manner as above.

The epoxy equivalent weights and the complex viscosities $\eta^*$ at 50° C. of the matrix materials of Examples 8 to 16 and Comparative Example 2 and the shear strengths $\tau$ of the matrix materials of Examples 8 to 16 are shown in FIG. 2.

Comparative Example 3

JER828 (trade name, available from Mitsubishi Chemical Corporation) was used as a conventional epoxy resin, and the above hardener was added thereto to prepare a matrix material according to Comparative Example 3.

The complex viscosity $\eta^*$ at 50° C. and the interface adhesive strength (shear strength $\tau$) on the carbon fiber A or B of the matrix material of Comparative Example 3 were measured by the microdroplet method in the same manner as above. The results are shown in FIG. 3. Incidentally, the jER828 had an epoxy equivalent weight of 190, and 33 parts by weight of the hardener was added to 100 parts by weight of the matrix resin of Comparative Example 3.

As shown in FIG. 1, in each of the matrix materials of Examples 1 to 7, the matrix resin had an average epoxy equivalent weight of 109 to 162 and a complex viscosity $\eta^*$ of 200 to 480 Pa·s at 50° C. In contrast, in the matrix material of Comparative Example 1 free from the third epoxy resin, the matrix resin had an average epoxy equivalent weight of 99 and a complex viscosity $\eta^*$ of 32 Pa·s at 50° C.

Among the matrix materials of Examples 1 to 7, the matrix material of Example 1 had the highest shear strength $\tau$ on the carbon fiber A. Thus, when the composition ratios of the MY 721, jER630, YX4000, and jER1006FS were 40, 40, 0, and 20 respectively and the average epoxy equivalent weight of the matrix resin was 120, the shear strength $\tau$ was 94 MPa.

The matrix material of Example 5 had the lowest shear strength $\tau$ on the carbon fiber A. Thus, when the composition ratios of the MY 721, jER630, YX4000, and jER1006FS were 30, 10, 50, and 10 respectively and the average epoxy equivalent weight of the matrix resin was 146, the shear strength $\tau$ was 80 MPa.

As shown in FIG. 3, the complex viscosity $\eta^*$ at 50° C. of the matrix material of Comparative Example 3 free from the third epoxy resin was 12 Pa·s. The shear strength $\tau$ of the matrix material of Comparative Example 3 on the carbon fiber A was 55 MPa.

As shown in FIG. 2, in each of the matrix materials of Examples 8 to 16, the matrix resin had an average epoxy equivalent weight of 109 to 162 and a complex viscosity $\eta^*$ of 200 to 480 Pa·s at 50° C. In contrast, in the matrix material of Comparative Example 2 free from the third epoxy resin, the matrix resin had an average epoxy equivalent weight of 107 and a complex viscosity $\eta^*$ of 66 Pa·s at 50° C.

Among the matrix materials of Examples 8 to 16, the matrix material of Example 8 had the highest shear strength $\tau$ on the carbon fiber B. Thus, when the composition ratios of the MY 721, jER630, YX4000, and jER1006FS were 60, 20, 5, and 15 respectively and the average epoxy equivalent weight of the matrix resin was 121, the shear strength $\tau$ was 94 MPa.

The matrix material of Example 16 had the lowest shear strength $\tau$ on the carbon fiber B. Thus, when the composition ratios of the MY 721, jER630, YX4000, and jER1006FS were 20, 0, 75, and 5 respectively and the average epoxy equivalent weight of the matrix resin was 162, the shear strength $\tau$ was 77 MPa.

As shown in FIG. 3, the shear strength $\tau$ of the matrix material of Comparative Example 3 on the carbon fiber B was 49 MPa.

Thus, it was clear that the viscosity of the matrix material was prevented from being excessively lowered more effectively and was controlled within a more preferred range in Examples 1 to 16 using the third epoxy resin as compared to Comparative Examples 1 to 3 not using the third epoxy resin.

Furthermore, it was clear that the shear strengths $\tau$ of the matrix materials of Examples 1 to 16 were higher than that of the matrix material of Comparative Example 3 using the conventional epoxy resin.

In each of the matrix materials of Examples 1 to 16, the matrix resin contained 20 to 70 phr of the first epoxy resin, 20 to 75 phr of the second epoxy resin, and 5 to 20 phr of the third epoxy resin. In addition, the matrix resin contained 80 to 95 phr of the epoxy resin mixture of the first and second epoxy resins and 20 to 5 phr of the third epoxy resin, and 41 to 66 parts by weight of the hardener was added to 100 parts by weight of the matrix resin.

Thus, the viscosity could be controlled within a more preferred range and the adhesive strength at the carbon fiber interface can be further increased in the matrix materials of Examples 1 to 16 satisfying the above conditions as compared to the matrix material using the conventional epoxy resin. Specifically, the matrix materials of Examples 1 to 16 had shear strengths $\tau$ of 77 to 94 MPa, which was 1.6 to 1.9 times higher than that of the matrix material using the conventional epoxy resin.

In a case where such a matrix material having an appropriately controlled viscosity and an increased shear strength $\tau$ is used for preparing a prepreg and producing a final product of a CFRP structure, the entire resultant structure can have an effectively improved strength property, etc. Consequently, the structure can exhibit excellent properties suitable for use as a member of an aircraft.

Examples of Second Embodiment

Example 17

Araldite MY 721 (available from Huntsman Advanced Materials, hereinafter referred to also as the MY 721) was used as a polyfunctional glycidylamine-type epoxy resin in a fourth epoxy resin. jER828 and jER1001 (both available from Mitsubishi Chemical Corporation) were used as a first and second bisphenol A-type epoxy resins in a fifth epoxy resin respectively. Furthermore, Aradur 976-1 (available from Huntsman Advanced Materials) was used as a hardener.

The hardener was added to the fourth epoxy resin (MY 721) and the fifth epoxy resin (jER828 and jER1001) to prepare a matrix material according to an example. Specifically, matrix materials a to d were prepared by mixing the MY 721, jER828, jER1001, and the hardener at composition ratios shown in FIG. 4.

The composition ratios shown in FIG. 4 were controlled in such a manner that the matrix resin had an average epoxy equivalent weight of 140 to 196 in each of the matrix materials a to d. The MY 721, jER828, and jER1001 had epoxy equivalent weights of 106, 190, and 475, respectively. Thus, the composition ratios of the epoxy resins were determined in view of obtaining an average epoxy equivalent weight within the above range based on the above equation (a).

Each epoxy resin is a thermosetting resin having a remarkable viscoelasticity, and the elastic component and the viscous component are changed depending on temperature. In particular, at a temperature for performing the hardening reaction (molding temperature), the hardening reaction proceeds with the elapsed time at the molding temperature (hereinafter referred to simply as the elapsed time), and the viscous component is reduced and the elastic component is increased. When the ratio between the viscous component and the elastic component, i.e. the loss angle $\delta$ of the loss tangent which is a ratio of the loss elastic modulus E″ to the storage elastic modulus E′ (tan $\delta$=E″/E′), is an appropriate value, pressure application to a prepreg is started. Void formation and matrix material flow out can be more effectively prevented in the resultant structure in this manner.

Therefore, in this example, the dynamic viscoelasticity of each of the matrix materials a to d is measured at the molding temperature to obtain a loss angle δ, and a pressurization start range, in which the pressure application to the prepreg is started, is determined based on the loss angle δ.

Specifically, first, the dynamic viscoelasticity of each of the matrix materials a to d is measured at a molding temperature of 150° C. for performing the hardening reaction. The molding temperature may be determined depending on the type of the hardener used in combination with the matrix resin, and is generally a temperature suitable for molding the epoxy resin (the thermosetting resin).

Then, the relationship between the loss angle δ and the elapsed time after the temperature of the matrix material reaches the molding temperature is obtained based on the dynamic viscoelasticity measurement results. An elapsed time range, in which the loss angle δ is reduced from the maximum value to a value within a predetermined range of 0.43 to 1.57 rad, is obtained as the pressurization start range based on the relationship.

The results of the dynamic viscoelasticity measurement of the matrix material a at a molding temperature of 150° C. are shown in FIG. 5. A specific method for determining the pressurization start range will be described below with reference to FIG. 5.

Incidentally, as shown in FIG. 4, the matrix resin in the matrix material a contains 30 phr of the fourth epoxy resin, 40 phr of the first bisphenol A-type epoxy resin in the fifth epoxy resin, and 30 phr of the second bisphenol A-type epoxy resin in the fifth epoxy resin. phr means a weight ratio to the total weight 100 of the matrix resin containing the fourth and fifth epoxy resins. 34 parts by weight of the hardener is added to 100 parts by weight of the matrix resin.

The dynamic viscoelasticity measurement of FIG. 5 was carried out using PHYSICA MCR 301 (trade name, available from Anton Paar) under conditions of a frequency of 1 Hz and an oscillation angle γ of 10% (36 deg).

The matrix material a is a thermosetting resin as described above. Therefore, the hardening reaction proceeds with the elapsed time. As shown in FIG. 5, until the elapsed time reaches approximately 18 minutes (gelation point), the storage elastic modulus E' is lower than the loss elastic modulus E", and the viscous component is larger than the elastic component. On the other hand, after the elapsed time reaches approximately 18 minutes, the storage elastic modulus E' is higher than the loss elastic modulus E", and the elastic component is larger than the viscous component.

The time point, at which the ratio between the viscous component and the elastic component becomes an appropriate value depending on the elapsed time in this manner, may be used as a pressurization start time point for the pressure application to the prepreg. The change of the ratio between the elastic component and the viscous component with the elapsed time can be evaluated by the loss angle δ of the loss tangent which is the ratio of the loss elastic modulus E" to the storage elastic modulus E' (tan δ=E"/E').

Therefore, in this example, an elapsed time range of 7.3 to 22.3 minutes, in which the loss angle δ is reduced from the maximum value to a value of 0.43 to 1.57 rad, is obtained as the pressurization start range of the matrix material a.

The pressurization start ranges of the matrix materials b to d are determined in the same manner as that of the matrix material a. Thus, the pressurization start range of the matrix material b is an elapsed time range of 6.9 to 22.1 minutes, the pressurization start range of the matrix material c is an elapsed time range of 7.2 to 23.4 minutes, and the pressurization start range of the matrix material d is an elapsed time range of 7.6 to 20.9 minutes.

Then, a UD material containing an aramid fiber KEVLAR 49 (trade name, available from Toray Industries, Inc.) as an organic fiber is impregnated with each of the matrix materials a to d to prepare a prepreg C. organic fiber is impregnated with each of the matrix materials a to d to prepare a prepreg C.

In the step of molding each prepreg C under heat and pressure, the pressurization is started when the elapsed time after the temperature of the prepreg C reaches the molding temperature is within the above pressurization start range. As shown in FIG. 6, using each of the matrix materials a to d, the pressurization is started at seven pressurization start time points corresponding to seven loss angles δ to produce seven plate structures C1 to C7.

Specifically, in the production of the plate structures C1 to C7 having vertical×horizontal dimensions of 100 mm×100 mm and a desired thickness (predetermined thickness) of 1 mm, at first the organic fiber (the UD material) is impregnated with each of the matrix materials a to d to prepare the prepreg C. The prepreg C is introduced into a vacuum bag, and the vacuum bag is placed in a furnace of an autoclave. Then, the furnace temperature is increased to the molding temperature of 150° C. and maintained for 1 hour. In the step of molding under heat and pressure, the inner pressure of the furnace is increased at each of the seven pressurization start time points during the 1 hour. Then, the furnace temperature of the autoclave is increased to 180° C., and this temperature is maintained for 2 hours, whereby each of the matrix materials a to d is sufficiently hardened.

Seven structures C1 to C7 using different pressurization start time points are produced from the prepreg C using each of the matrix materials a to d in this manner. Incidentally, in a case where the structures C1 to C7 taken from the furnace have a burr, the burr is cut by a cutting machine to obtain the vertical×horizontal dimensions of 100 mm×100 mm.

Thus-obtained structures C1 to C7 were subjected to a non-destructive test using an ultrasonic flaw detector (5 MHz). In each structure, the number of voids having a length of 5 mm or more was measured as a defect number, and the thickness was measured by using a micrometer. The results are shown in FIG. 6.

As is clear from FIG. 6, in all the structures C1 to C7 using the matrix materials a to d, the defect numbers are not more than 4, and the measured thickness (molding dimension) values are within a range of the desired thickness 1 mm±20%. Thus, it is clear that the structures C1 to C7 capable of preventing the void formation and having the desired molding dimension can be produced by using any one of the matrix materials a to d.

As shown in FIG. 4, in the matrix materials a to d, the matrix resin contains 20 to 60 phr of the fourth epoxy resin and 80 to 40 phr of the fifth epoxy resin, and 30 to 43 parts by weight of the hardener is added to 100 parts by weight of the matrix resin. Furthermore, the fifth epoxy resin contains 20 to 60 phr of jER828 (the first bisphenol A-type epoxy resin) and 20 to 45 phr of jER1001 (the second bisphenol A-type epoxy resin).

Thus, it is clear that by using the matrix material satisfying the above conditions, the organic fiber-reinforced composite structure can be produced with high strength and quality while achieving both of the void prevention and the desired molding dimension.

Furthermore, it is clear from FIG. 6 that in each of the structures C1 to C4 using the pressurization start time points in the elapsed time range corresponding to the loss angle δ ranging from 1.19 to 1.57 rad, the defect number is 0, and the measured thickness value is within a range of the desired thickness 1 mm±10%. Thus, when the pressure application to the prepreg is started within the elapsed time range (the pressurization start range) in which the loss angle δ of each of the matrix materials a to d is reduced from the maximum value to 1.19 to 1.57 rad at the molding temperature, the void formation in the structure can be further effectively prevented, and the dimension of the structure can be more effectively controlled at the desired molding dimension.

Namely, when the pressure application to the prepreg is started after the elapsed time reaches a time corresponding to the loss angle δ of 1.57 rad, the matrix material can be prevented from flowing out from the organic fiber and being hardened in this state to form a burr or the like in the step of applying a pressure to the prepreg. Consequently, the lack of the matrix material in the prepreg can be avoided, and the hardened matrix material can be prevented from being removed as the burr or the like, so that the structure can be more easily produced with the desired molding dimension.

In addition, when the pressure application to the prepreg is started before the elapsed time reaches a time corresponding to the loss angle δ of 1.19 rad, the matrix material can be moved as well as the organic fiber in the step of molding the prepreg under pressure. Consequently, the air bubbles can be easily discharged from the matrix material, and the organic fiber can be sufficiently impregnated with the matrix material in the structure. Thus, the void formation can be further effectively prevented in the structure.

As described above, by using the matrix material of the second embodiment, the air bubble retention and the thickness change can be effectively prevented in the step of molding the prepreg under heat and pressure, and the structure containing the high-quality organic fiber-reinforced resin can be produced. Furthermore, by determining the prepreg pressurization start time point within the above range, the above advantageous effects can be achieved more significantly.

What is claimed is:

1. A matrix material for a carbon fiber-reinforced composite comprising a matrix resin, wherein
the matrix resin contains both of a first epoxy resin and a second epoxy resin or only the first epoxy resin, and further contains a third epoxy resin,
the first epoxy resin contains a polyfunctional glycidylamine-type epoxy resin having four epoxy groups in one molecule,
the second epoxy resin contains at least one of a p-aminophenol-type epoxy resin having three epoxy groups in one molecule and a tetramethylbiphenol-type solid epoxy resin having two epoxy groups in one molecule,
the third epoxy resin contains a bisphenol A-type epoxy resin having two epoxy groups in one molecule and having a weight-average molecular weight of 8000, and
the matrix resin has an average epoxy equivalent weight of 109 to 162, which is calculated using the following equation (A):

the average epoxy equivalent weight of the matrix resin=100/[(a weight percentage of the first epoxy resin [phr]/106)+(a weight percentage of the $p$-aminophenol-type epoxy resin [phr]/92)+(a weight percentage of the tetramethylbiphenol-type solid epoxy resin [phr]/177)+(a weight percentage of the third epoxy resin [phr]/1000)].

2. The matrix material according to claim 1, wherein
the matrix resin contains 20 to 70 phr of the first epoxy resin, 20 to 75 phr of the second epoxy resin, and 5 to 20 phr of the third epoxy resin.

3. The matrix material according to claim 1, wherein
the polyfunctional glycidylamine-type epoxy resin is represented by the following structural formula (1),
the p-aminophenol-type epoxy resin is represented by the following structural formula (2),
the tetramethylbiphenol-type solid epoxy resin is represented by the following structural formula (3),
the bisphenol A-type epoxy resin is represented by the following structural formula (4), and
the matrix resin contains 80 to 95 phr of an epoxy resin mixture of the polyfunctional glycidylamine-type epoxy resin and at least one of the p-aminophenol-type epoxy resin and the tetramethylbiphenol-type solid epoxy resin, and further contains 20 to 5 phr of the bisphenol A-type epoxy resin

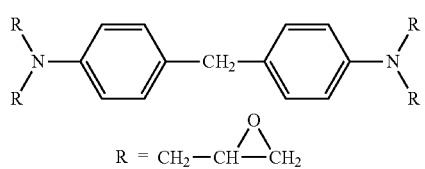

(1)

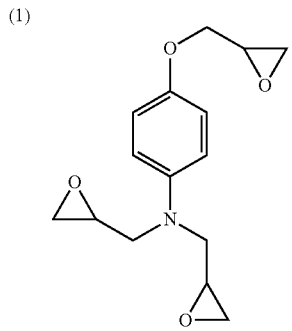

(2)

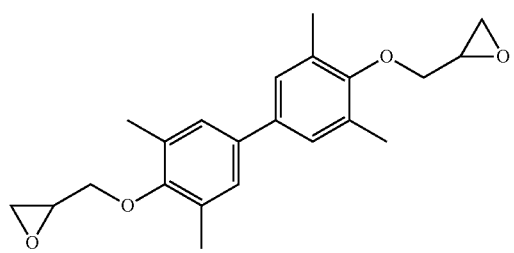

(3)

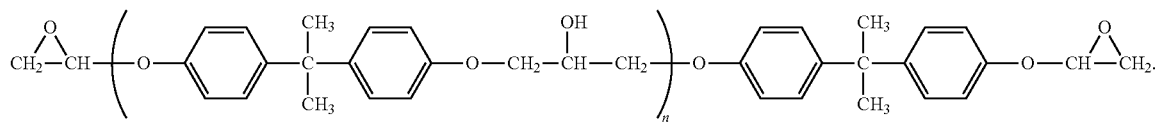

(4)

4. The matrix material according to claim 3, wherein the epoxy resin mixture contains 20 to 70 phr of the polyfunctional glycidylamine-type epoxy resin and 75 to 20 phr of at least one of the p-aminophenol-type epoxy resin and the tetramethylbiphenol-type solid epoxy resin.

5. The matrix material according to claim 1, further comprising 41 to 66 parts by weight of a hardener relative to 100 parts by weight of the matrix resin.

6. The matrix material according to claim 1, wherein the matrix material has a complex viscosity of 200 to 480 Pa·s at 50° C.

7. The matrix material according to claim 1, wherein the matrix material has an adhesive strength of 77 to 94 MPa to a carbon fiber measured by a microdroplet method.

8. A matrix material for an organic fiber-reinforced composite comprising a matrix resin, wherein
the matrix resin contains a first epoxy resin and a second epoxy resin,
the first epoxy resin contains a polyfunctional glycidylamine-type epoxy resin having four epoxy groups in one molecule,
the second epoxy resin contains a first bisphenol A-type epoxy resin having two epoxy groups in one molecule and having a weight-average molecular weight of 380, and further contains a second bisphenol A-type epoxy resin having two epoxy groups in one molecule and having a weight-average molecular weight of 900, and
the matrix resin has an average epoxy equivalent weight of 140 to 196, which is calculated using the following equation (a):

the average epoxy equivalent weight of the matrix resin=100/[(a weight percentage of the first epoxy resin [phr]/106)+(a weight percentage of the first bisphenol *A*-type epoxy resin [phr]/190)+(a weight percentage of the second bisphenol *A*-type epoxy resin [phr]/475)].

9. The matrix material according to claim 8, wherein the matrix resin contains 20 to 60 phr of the first epoxy resin and 40 to 80 phr of the second epoxy resin.

10. The matrix material according to claim 8, wherein
the polyfunctional glycidylamine-type epoxy resin is represented by the following structural formula (5),
the first bisphenol A-type epoxy resin is represented by the following structural formula (6),
the second bisphenol A-type epoxy resin is represented by the following structural formula (7), and
the matrix resin contains 20 to 60 phr of the polyfunctional glycidylamine-type epoxy resin and 40 to 80 phr of the first bisphenol A-type epoxy resin and the second bisphenol A-type epoxy resin

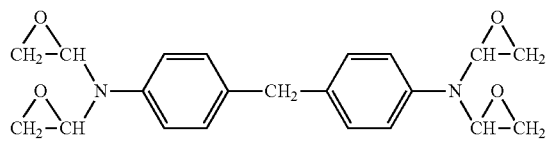

(5)

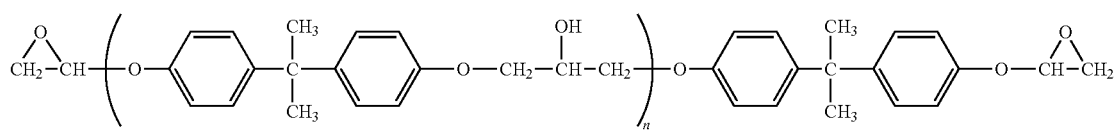

(6)

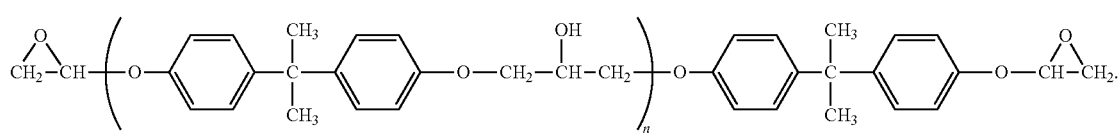

(7)

11. The matrix material according to claim 10, wherein the matrix resin contains 20 to 60 phr of the first bisphenol A-type epoxy resin and 20 to 45 phr of the second bisphenol A-type epoxy resin.

12. The matrix material according to claim 8, further comprising 30 to 43 parts by weight of a hardener relative to 100 parts by weight of the matrix resin.

13. The matrix material according to claim 8, wherein the matrix material has an adhesive strength of 77 to 94 MPa to an organic fiber measured by a microdroplet method.

\* \* \* \* \*